US009894165B2

(12) United States Patent
Yazir et al.

(10) Patent No.: US 9,894,165 B2
(45) Date of Patent: Feb. 13, 2018

(54) SYSTEMS AND METHODS FOR DECENTRALIZED SERVICE PLACEMENT IN A RESOURCE POOL

(71) Applicant: Telefonaktiebolaget L M Ericsson (publ), Stockholm (SE)

(72) Inventors: Yağiz Onat Yazir, San Jose, CA (US); Joacim Halén, San Jose, CA (US); Zahra Abbasi, Cupertino, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 237 days.

(21) Appl. No.: 14/856,492

(22) Filed: Sep. 16, 2015

(65) Prior Publication Data
US 2017/0078409 A1    Mar. 16, 2017

(51) Int. Cl.
*H04L 29/08*    (2006.01)
*H04L 12/911*   (2013.01)
(Continued)

(52) U.S. Cl.
CPC ............ *H04L 67/16* (2013.01); *G06F 9/5027* (2013.01); *G06F 17/30327* (2013.01); *G06F 17/30424* (2013.01); *H04L 47/829* (2013.01)

(58) Field of Classification Search
CPC ....................................................... H04L 67/16
(Continued)

(56) References Cited

U.S. PATENT DOCUMENTS 6,381,735 B1    4/2002 Hunt
6,983,463 B1    1/2006 Hunt
(Continued)

OTHER PUBLICATIONS

IEEE 802.11b-1999: "Higher Speed Physical Layer (PHY) Extension in the 2.4 GHz Band," IEEE Standard for Information Technology, Telecommunications and information exchange between systems, Local and Metropolitan networks, Specific requirements, Part 11: Wireless LAN Medium Access Control (MAC) and Physical Layer (PHY) specifications, Sep. 16, 1999, 96 pages.
(Continued)

*Primary Examiner* — Adnan Mirza
(74) *Attorney, Agent, or Firm* — Nicholson De Vos Webster & Elliott, LLP

(57) ABSTRACT

Exemplary methods for distributed multi-component service placement in a resource pool include utilizing a hierarchy of agents associated with computing resources of a cloud architecture. A root agent in the hierarchy can receive service requests specifying resource requirements and optionally location or affinity constraints, transform these into service request descriptions, and pass the service request descriptions down through the hierarchy to arrive at leaf nodes. The leaf nodes can each, perhaps in parallel, generate solution encodings indicating possible placements of some or all of the components of the service request that one or more computing devices associated with each agent can locally provide while still satisfying the resource requirements. The generated solution encodings can be passed back up and be consolidated as they flow through the hierarchy, allowing the root agent to quickly and accurately determine whether the service request may be fulfilled, and optionally place the service.

22 Claims, 10 Drawing Sheets

(51) Int. Cl.
*G06F 17/30* (2006.01)
*G06F 9/50* (2006.01)

(58) Field of Classification Search
USPC .......................................................... 709/226
See application file for complete search history.

(56) References Cited

U.S. PATENT DOCUMENTS

| | | | |
|---|---|---|---|
| 8,959,523 | B2 | 2/2015 | Patil et al. |
| 9,081,617 | B1 | 7/2015 | Pendharkar et al. |
| 9,641,643 | B2 | 5/2017 | Mohaban et al. |
| 2003/0084157 | A1 | 5/2003 | Graupner et al. |
| 2003/0236822 | A1 | 12/2003 | Graupner et al. |
| 2009/0204789 | A1 | 8/2009 | Gooding et al. |
| 2010/0262975 | A1 | 10/2010 | Reysa et al. |
| 2013/0031559 | A1* | 1/2013 | Alicherry ............. G06F 9/5077 718/104 |
| 2013/0263120 | A1 | 10/2013 | Patil et al. |
| 2013/0304903 | A1* | 11/2013 | Mick ................. H04L 43/0817 709/224 |
| 2013/0325899 | A1 | 12/2013 | Mohaban et al. |
| 2015/0128293 | A1 | 5/2015 | Hitomi et al. |
| 2015/0271280 | A1 | 9/2015 | Zhang et al. |

OTHER PUBLICATIONS

IEEE 802.11-2012: "Part 11: Wireless LAN Medium Access Control (MAC) and Physical Layer (PHY) Specifications," IEEE Standard for Information technology, Telecommunications and information exchange between systems, Local and metropolitan area networks, Specific requirements, Mar. 29, 2012, 2793 pages.

Kernighan, et al., "An Efficient Heuristic Procedure for Partitioning Graphs," AT&T, Bell Syst. Tech. J., vol. 49, No. 2, Feb. 1970, 5 pages.

Delimitrou, et al., "Tarcil: Reconciling Scheduling Speed and Quality in Large Shared Clusters," ACM, SoCC '15, Aug. 2015, 14 pages.

Boutin, et al., "Apollo: Scalable and Coordinated Scheduling for Cloud-Scale Computing," 11th USENIX Symposium on Operating Systems Design and Implementation (OSDI '14), Oct. 6-8, 2014, 17 pages.

Hindman, et al., "Mesos: A Platform for Fine-Grained Resource Sharing in the Data Center," 8th USENIX Symp. on Networked Systems Design and Implementation (NSDI '11), Mar. 30-Apr. 1, 2011, 14 pages.

Schwarzkopf, et al., "Omega: flexible, scalable schedulers for large compute clusters," ACM, EuroSys'13, Apr. 15-17, 2013, 14 pages.

Szeto, et al., "A Multi-Commodity Flow Based Approach to Virtual Network Resource Allocation," IEEE, GLOBECOM'03, vol. 6, 18 pages.

Vavilapalli, et al., "Apache Hadoop YARN: Yet Another Resource Negotiator," ACM, SoCC'13, Oct. 1-3, 2013, 16 pages.

Verma, et al., "Large-scale cluster management at Google with Borg," ACM, EuroSys'15, Apr. 21-24, 2015, 18 pages.

Xin, et al., "Embedding Virtual Topologies in Networked Clouds," ACM, CFI '11 Jun. 13-15, 2011, 4 pages.

Yu, et al., "Rethinking Virtual Network Embedding: Substrate Support for Path Splitting and Migration," ACM SIGCOMM Computer Communication Review, vol. 38, No. 2, Apr. 2008, pp. 19-29.

Zong, et al., "Cloud service placement via subgraph matching," ICDE '14, 2014 IEEE 30th International Conference on Data Engineering, Mar. 31-Apr. 4, 2014, 12 pages.

U.S. Appl. No. 14/936,469, Pending.

\* cited by examiner

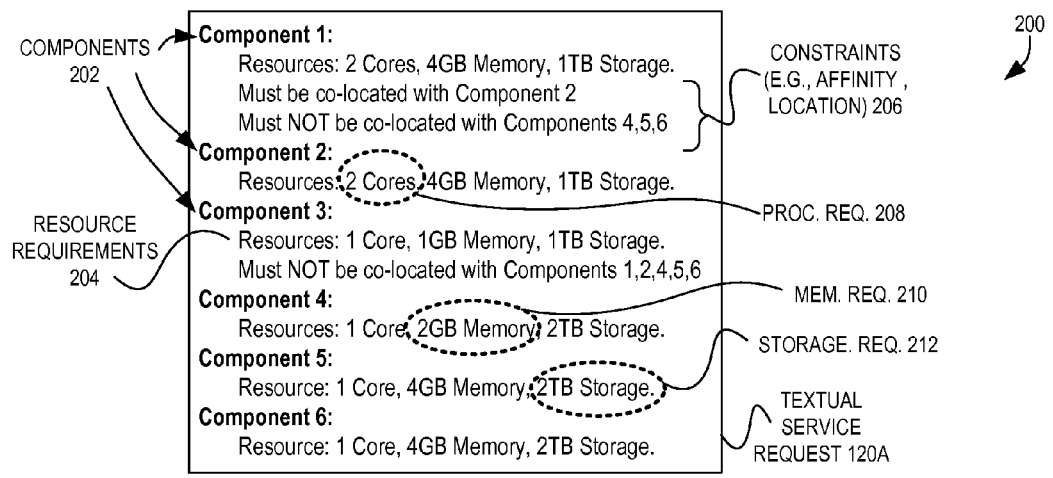
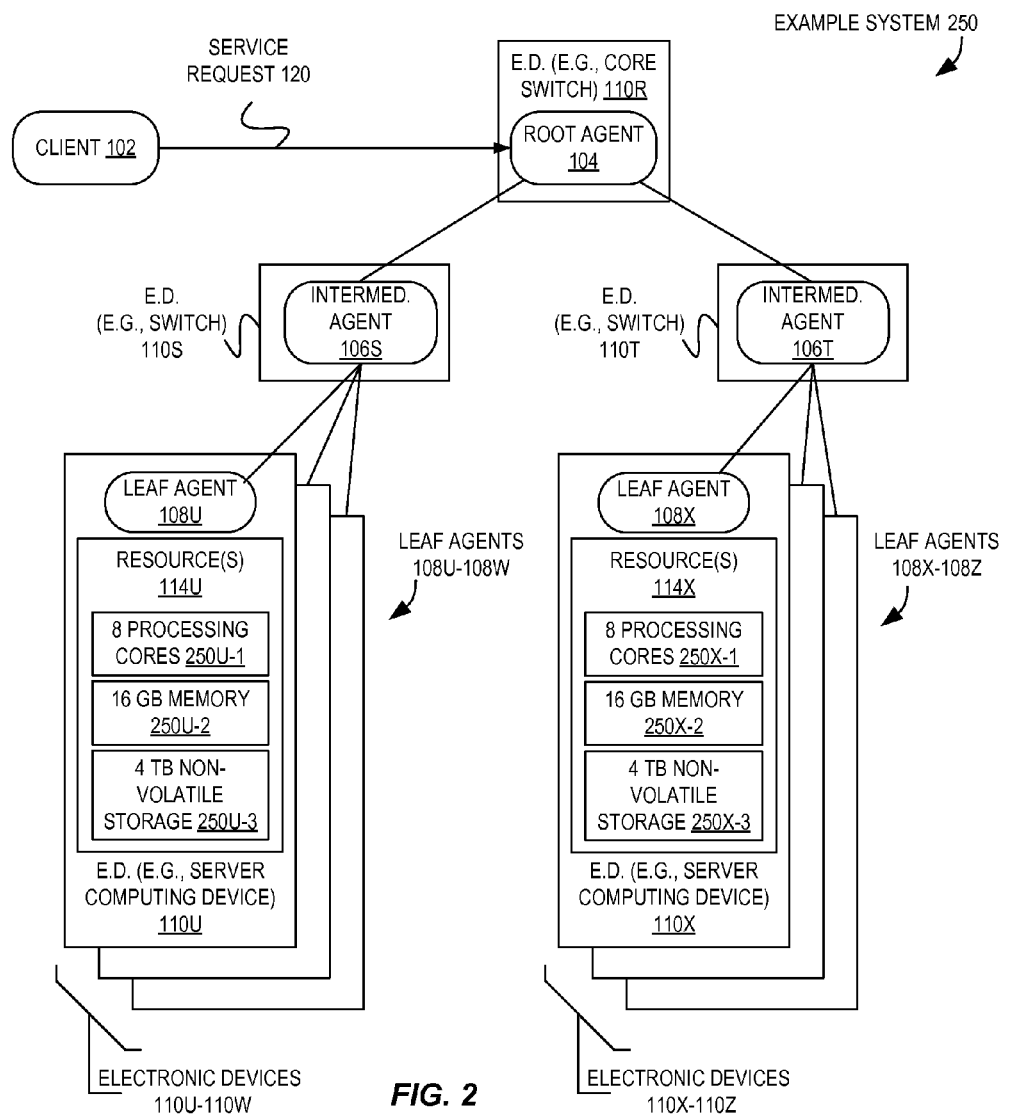
FIG. 2

SYSTEMS AND METHODS FOR DECENTRALIZED SERVICE PLACEMENT IN A RESOURCE POOL

FIELD

Embodiments of the invention relate to the field of computing systems, and more specifically, to decentralized service placement in a resource pool.

BACKGROUND

The computational infrastructure of a distributed cloud may consist of hundreds of thousands of servers, distributed across a set of geographically distributed datacenters. Such a distributed cloud will show a huge degree of heterogeneity in the size of each datacenter as well as in the capacities of the available resources. The latter case, in particular, is also particularly valid within a single datacenter, which can have a variety of different types of resources that may be provided by different vendors.

Large-scale cloud infrastructures require a service placement solution that can efficiently determine, for a given service request, a set of available resources that matches the requirements of the service request (e.g., a number of virtual CPUs, an amount of memory and/or storage, an amount of specialized processing units, a network capacity, etc.) Primarily, this solution must be found, given that it exists, in a timely fashion. However, this task is extremely challenging, in part due to the potentially massive search space naturally involved in such large scale, dynamic, distributed, and/or extremely-heterogeneous contemporary cloud infrastructures. Furthermore, it is even more challenging when the heterogeneity of the workload and the requirements of service requests is taken in account.

For example, the workload of the cloud comes from various services ranging from delay-sensitive services such as gaming, video-conferencing, and multi-tier web services, to delay-tolerant batch services such as high performance computing and map-reduce types of applications. Such services usually operate through the use of one or more software components. Each component can have certain requirements ranging from the physical characteristics of the host platform—such as an availability of certain hardware accelerators, resources in terms of CPU, memory, storage, and network—to placement and affinity requirements defined via location and colocation constraints.

Placement and affinity constraints can be specified by clients for purposes such as fault-tolerance or compliance with organizational or legal regulations. For example, such placement and/or affinity requirements may limit the location of certain service components to a specific geographic location or a specific datacenter. Furthermore, they can impose a set of rules declaring which components of a requested service should be co-located, and/or which components of the service are not to be co-located. Thus, when a service placement request arrives, a cloud platform has to quickly find—and reserve—a set of resource units (e.g., containers, virtual machines, bare metal machines, etc.) to run the service components and form their network connectivity.

Some large-scale cloud resource scheduling solutions have been developed in the academic and the industrial domains, such as projects referred to as Apollo, Borg, Mesos, Omega, and Yarn. However, these solutions are primarily designed for single datacenter Platform-as-a-Service (PaaS) clouds, and have a main focus of hosting applications that only target data-parallel tasks (e.g., MapReduce tasks). Thus, these solutions utilize various techniques to perform per-task scheduling such that the desired objectives are fulfilled while preserving the order in which the tasks are run. For example, Borg and Omega also handle workload heterogeneity by utilizing various categorization and scoring techniques that prioritize tasks in order to make better placement decisions.

Additionally, existing Infrastructure-as-a-Service (IaaS) solutions, such as OpenStack, primarily perform scheduling for a single datacenter. In such solutions, a service placement request is processed one component at a time. For instance, the scheduler used by OpenStack's Nova performs scheduling on a per computational unit (e.g., a virtual machine (VM)) basis considering the affinity rules associated with the request. The scheduling solution first filters the compute resources that meet the requirements. It then chooses the best candidate based on a linear weighted average cost model. OpenStack's orchestration service, named Heat, handles multi-component service requests across several computational units in terms of affinities and network connectivity, but each component is managed one-by-one.

There also are a number of studies in the academic literature proposing optimization-based solutions for cloud workload placement. The solutions are typically designed in order to place cloud workload such that a cloud utility cost model (e.g., Service-Level Agreement (SLA) revenue, energy consumption, electricity cost) is optimized without compromising delay requirements of the workload. These placement algorithms, however, also typically deal with determining a placement for a standalone software component, rather than a service placement including multiple components.

Additionally, a complete service request typically includes requirements for multiple resources—computational, memory, storage, network, etc.—needed for the service. Most of the existing solutions do not take the request as a whole into account; instead, they decompose the request into its pieces and try to match the requirements for each entity in isolation. However, if the system fails to allocate one of the resource entities, it must perform a rollback, which involves undoing all successful allocations of resource entities in the service request. Additionally, existing solutions are typically centralized or rely on centralized data storage that holds information on all available free resources in the system. This is feasible in smaller datacenters; however, it does not scale well in large datacenters or in distributed clouds.

Moreover, a more fundamental problem that also needs to be addressed is the strongly probable combinatorial explosion of possible service placement solutions that result as datacenters get larger and larger. This problem is particularly large when many datacenters are connected into a distributed cloud, and more requirements are taken into account.

The applications of the existing solutions (such as in Apollo and Borg, for example) for distributed cloud service placement, where service requests come with different affinity policies, are extremely restricted. In particular, existing solutions simplify the problem by either assuming that a set of feasible solutions are already given or are very easy to find, or primarily focus only upon data-parallel types of applications and do not deal with affinities associated with various components of the applications.

However, given a huge search space of various cloud infrastructures, finding a feasible set for placing a service is not an easy task. This is especially problematic for the case where there are complex affinity policies for various components of the service in terms of collocations, and when most of the physical servers do not have a large abundance of available resources. In such a case, unless a search is performed through all of the physical resources, the feasible set is very unlikely to be found, resulting in false negative answers. Further, performing scheduling on a per-component basis, without considering its relation to the placement of the other components in the same placement query, will often result in poor performance as a result. This is because such a solution needs some sort of rollback scheme to ensure the affinities across components.

Further, some implementations rely on the availability of system-wide resource availability information existing in a centralized location, and thus require a global view of the cloud's available resources. However, these systems suffer from limited scalability, particularly in modern, large, often-dynamic, distributed infrastructures with heterogeneous hardware and software resources.

Finally, the underlying assumption of the existing theoretical works is that it is possible to achieve a complete global knowledge on the available resources, and accordingly, a feasible set of placements. Based on this assumption, such solutions are designed to find the placement that optimizes the cost. However, for a large-scale distributed cloud infrastructure, searching for a feasible placement is not always an easy task due to the various requirements of services, and the dynamic nature of the cloud's available resources. More importantly, these solutions typically perform per-component scheduling rather than per-service scheduling.

Accordingly, there is a strong need for rapid, scalable, efficient, and accurate multi-component service placement systems in heterogeneous, dynamic, large, and/or distributed environments (e.g., in large datacenters, distributed cloud environments) that can accommodate imposed affinity and/or location-based constraints.

SUMMARY

Systems, methods, apparatuses, and computer-readable media are provided for enabling multi-component service placement in a resource pool using distributed techniques. Accordingly, a virtual infrastructure request can be submitted to a resource pool of one or more data centers serving as a part or entirety of a computing cloud, computing grid, computing cluster, etc. In some embodiments, service requests specifying resource requirements for multi-component services are received by a root agent 104 acting as a root of a hierarchy of agents, and the service requests are passed down through the hierarchy to leaf agents. The leaf agents can generate, based upon the service requests and a set of resources available at one or more computing devices associated with the leaf agent, one or more solution encodings indicating possible placements of some or all of the components of a service request description of the service request that the one or more computing devices can locally provide while satisfying the resource requirements of the some or all of the components. The generated solution encodings can be passed back up through the hierarchy, where the solution encodings can be consolidated (or aggregated) by intermediate agents before being further passed up through the hierarchy. The root agent 104 can receive one or more solution encodings from one or more other agents in the hierarchy acting as children of the root agent 104, and based upon these solution encodings, the root agent 104 can quickly and accurately determine whether the particular corresponding service request may or may not be fulfilled, can identify a complete set of possible placements for the service that satisfies the stated resource requirements and satisfies any constraints placed upon the service or individual components. Accordingly, the root agent 104 can send instructions to reserve resources for the service based upon the received one or more solution encodings.

Accordingly, in some embodiments the distributed service placement is highly-scalable, efficient, rapid, and accurate even when used in heterogeneous, dynamic, large, and/or distributed environments such as large datacenters or distributed cloud environments. In some embodiments, the distributed service placement can accommodate affinity and/or location-based constraints of the components.

According to some embodiments, the distributed service placement can, in a timely manner, find a feasible placement for a compound service in a very large datacenter or a distributed cloud containing, for example, hundreds of thousands of physical resources. Substantial portions of the service placement can be distributed and executed in parallel using only local information detailing available resources for making placement decisions, and thus, some embodiments require neither a comprehensive monitoring mechanism nor a global database containing information of all available resources for making placement decisions. Thus, embodiments can be fully distributed and utilize local decision-making based on local resource availability information, which can occur in parallel, which leads to high scalability and reduced complexity when compared to centralized, non-distributed service placement systems.

Embodiments can also take into account both the resource requirements and the affinities associated with various components of a service request, such as location affinities and colocation affinities among the components described in the service request, and can further consider components that are already hosted. Embodiments encode received service requests in such a way that they can be processed, as a whole, in a very efficient manner. In some embodiments, the entire search space of potential placement solutions will be covered and false negative answers will not be generated, and thus embodiments can rapidly determine whether or not a feasible solution exists.

According to some embodiments, an exemplary method performed by a leaf agent executing at a computing device and acting as a child to a parent agent in a hierarchy of agents for enabling decentralized service placement includes receiving, from the parent agent, a service request description that specifies resource requirements for a plurality of components of a service to be deployed. The method further includes generating, based upon the resource requirements, a query placement partition identifying a plurality of groups of the plurality of components. The plurality of groups includes at least one colocation group and at least one non-colocation group. The method also includes generating, based upon the query placement partition and a set of resources available at one or more computing devices associated with the leaf agent, one or more solution encodings indicating possible placements of some or all of the components of the service request description that the one or more computing devices can locally provide, while satisfying the resource requirements of the some or all of the components. The method further includes transmitting, to the parent agent, the one or more solution encodings.

In some embodiments, the generating of the one or more solution encodings comprises generating, based upon the plurality of groups identified by the query placement partition, one or more affinity-based encodings. Each of the one or more affinity-based encodings indicates a maximal number of components from each of the plurality of groups that could potentially be provided by the one or more computing devices.

In some embodiments, the generating of the one or more solution encodings further comprises generating, based upon the one or more affinity-based encodings and a description of available local resources of the one or more computing devices, one or more refined encodings. Each of the one or more refined encodings is derived from one of the one or more affinity-based encodings and indicates numbers of the components of the corresponding affinity-based encoding that the one or more computing devices can actually provide given the available local resources.

According to some embodiments, the resource requirements include, for each of the plurality of components, one or more of a processing resource requirement; a memory resource requirement; a storage resource requirement; and a network interface requirement.

In some embodiments, at least one of the plurality of groups identified by the query placement partition includes one or more non-colocation identifiers that identify one or more of the plurality of components that cannot be placed along with one or more other components of the group.

According to some embodiments, the method further includes transmitting, by the leaf agent to the parent agent, the generated query placement partition. In some embodiments, the parent agent is an intermediate agent in the hierarchy, acts as a parent to another leaf agent in the hierarchy, and acts as a child to another agent in the hierarchy. In some embodiments, the parent agent is executed by a network device, which can be a switch, router, or bridge.

In some embodiments, the received service request description further specifies at least one affinity or location constraint associated with at least some of the plurality of components, the generating of the query placement partition is further based upon the at least one affinity or location constraint; and the one or more solution encodings are generated to satisfy the at least one affinity or location constraint.

According to some embodiments, an exemplary method for enabling decentralized service placement performed by an intermediate agent executing at an electronic device and acting as a parent to a plurality of agents in a hierarchy and further acting as a child to another agent in the hierarchy includes receiving, from the another agent, a service request description that specifies resource requirements for a plurality of components of a service to be deployed. The method further includes transmitting, by the intermediate agent, the service request description to the plurality of agents acting as children of the intermediate agent in the hierarchy, and also receiving, by the intermediate agent from the plurality of agents, a plurality of solution encodings generated by the plurality of agents. Each of the plurality of solution encodings indicates an aggregated set of possible placements of some or all of the components of the service request description that one or more computing devices associated with the corresponding agent or associated with all descendant agents of the corresponding agent can provide while satisfying the resource requirements of the some or all of the components. The method further includes merging the plurality of solution encodings into one or more solution encodings that indicate another aggregated set of possible placements of some or all of the components of the service request description that one or more computing devices associated with the intermediate agent or associated with all descendant agents of the intermediate agent can provide while satisfying the resource requirements of the some or all of the components. The method further includes transmitting the one or more merged solution encodings to the another agent acting as a parent to the intermediate agent.

In some embodiments, the plurality of agents acting as children of the intermediate agent act as intermediate agents in the hierarchy. In some embodiments, the plurality of agents acting as children of the intermediate agent act as leaf agents in the hierarchy.

According to some embodiments, the method further includes generating one or more local solution encodings indicating possible placements of some or all of the components of the service request description that the electronic device executing the intermediate agent can locally provide while satisfying the resource requirements of the some or all of the components. The merging of the plurality of solution encodings into the one or more solution encodings also includes merging the generated one or more local solution encodings with the plurality of solution encodings received from the plurality of agents.

In some embodiments, the another agent acts as a root agent 104 in the hierarchy.

In some embodiments, the received service request description further specifies at least one affinity or location constraint associated with at least some of the plurality of components.

According to some embodiments, an exemplary system providing decentralized service placement includes a plurality of agents executing at one or more electronic devices and that are configured in a hierarchy. The plurality of agents include a root agent 104 acting as a root of the hierarchy, a plurality of intermediate agents arranged in one or more levels, and a plurality of leaf agents.

The root agent 104 is configured to receive service requests from clients indicating resource requirements for services to be deployed including pluralities of components, and transmit service request descriptions based upon the service requests to at least some of the plurality of intermediate agents of the hierarchy to be distributed through the hierarchy to the plurality of leaf agents of the hierarchy. The root agent 104 is also configured to receive solution encodings corresponding to the service request descriptions from at least some of the plurality of intermediate agents. The solution encodings are generated by the plurality of intermediate agents and indicate sets of possible placements of some or all of the components of each of the service request descriptions that can be provided by a plurality of computing devices associated with the plurality of leaf agents that satisfy resource requirements of the some or all of the components. The root agent 104 is also configured to determine, based upon the received solution encodings, whether the service requests can be placed using the plurality of computing devices.

Each of the plurality of intermediate agents is configured to receive the transmitted service request descriptions transmitted from the root agent 104 or another of the plurality of intermediate agents, and to transmit the received service request descriptions to one or more other intermediate agents or one or more of the plurality of leaf agents. Each of the plurality of intermediate agents is also configured to receive solution encodings corresponding to the service request descriptions from the one or more other intermediate agents or the one or more of the plurality of leaf agents, to merge the received solution encodings, and to transmit the merged solution encodings to the root agent 104 or to the another of the plurality of intermediate agents.

Each of the plurality of leaf agents is configured to receive, from one of the plurality of intermediate agents, the service request descriptions, and then to generate query placement partitions for the service request descriptions. Each query placement partition identifies a plurality of groups of a plurality of components specified in the service request description, where the plurality of groups include at least one colocation group and at least one non-colocation group. Each of the plurality of leaf agents is configured to generate solution encodings, based upon the generated query placement partitions and a set of resources available at one or more computing devices associated with the leaf agent. Each of the solution encodings indicates possible placements of some or all of the components of the corresponding service request description that the one or more computing devices can locally provide while satisfying the resource requirements of the some or all of the components. Each of the plurality of leaf agents is configured to then transmit, to the one of the plurality of intermediate agents, the solution encodings.

In some embodiments, the hierarchy includes a plurality of levels of the plurality of intermediate agents, and in some embodiments, the hierarchy includes only one level of intermediate agents.

In some embodiments, a first set of the plurality of leaf agents is associated with a first set of the one or more computing devices at a first data center that is geographically separate from a second data center having a second set of the one or more computing devices associated with a second set of the plurality of leaf agents. In some embodiments, all of the leaf agents are associated with computing devices within a single data center. In some embodiments, the leaf agents are themselves executed by their corresponding computing device(s) with which they are associated, but in some embodiments the leaf agents execute at completely distinct computing devices, which may or may not be within a same data center, geographic location, etc., as the corresponding computing device(s) with which they are associated.

In some embodiments, the root agent 104 is further configured to determine, based upon the received solution encodings, deployment configurations for the service requests that are determined as able to be placed, and to cause ones of the one or more computing devices to implement the some or all of the components of the service requests that are determined as able to be placed.

In some embodiments, the root agent 104 is further configured to determine, based upon the received service requests, the plurality of intermediate agents to which the root agent will transmit the service request descriptions. In some embodiments, the determination is based upon location constraints or resource requirements of the service requests.

In some embodiments, the root agent 104 is configured to transmit the service request descriptions to all of the plurality of intermediate agents of the hierarchy that act as children of the root agent 104 in the hierarchy.

According to some embodiments, at least some of the plurality of intermediate agents are executed by a plurality of network devices, wherein each network device comprises a switch device or a router device, and at least some of the plurality of leaf agents are executed by server computing devices.

In some embodiments, one or more of the service requests received by the root agent 104 specify at least one affinity or location constraint associated with at least some of the plurality of components of the corresponding service request. In some embodiments, each of the plurality of leaf agents generate the solution encodings, for those of the service requests that specify at least one affinity or location constraint, such that the corresponding solution encoding satisfies the at least one affinity or location constraint.

BRIEF DESCRIPTION OF THE DRAWINGS

The invention may best be understood by referring to the following description and accompanying drawings that are used to illustrate embodiments of the invention. In the drawings:

FIG. 2 illustrates an example textual service request together with an example system for decentralized service placement according to some embodiments.

DESCRIPTION OF EMBODIMENTS

Figure 1:
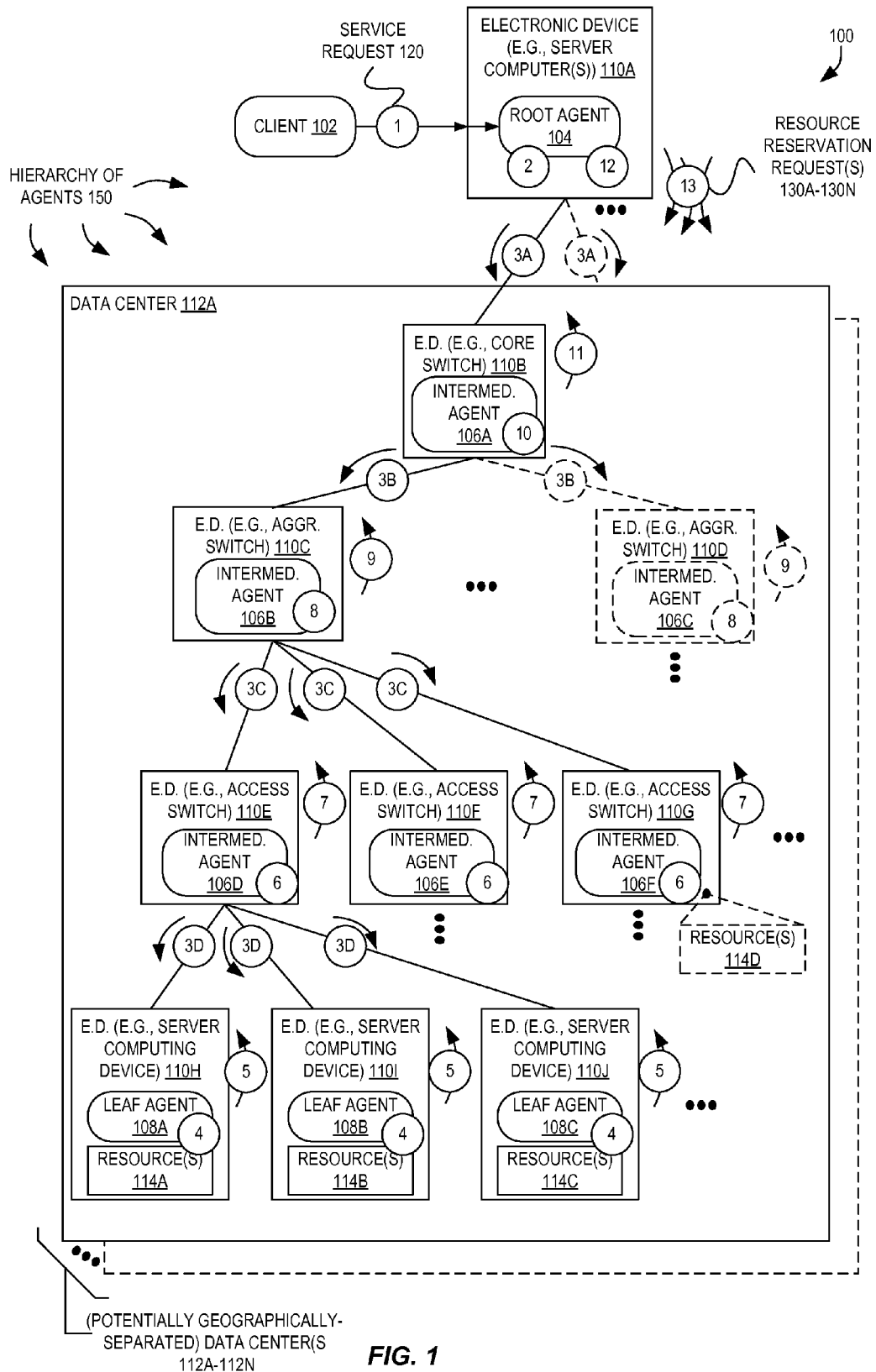
FIG. 1 is a high-level block diagram illustrating distributed processing for decentralized service placement across one or more data centers according to some embodiments.

The following description relates to the field of computing systems, and more specifically, describes methods, systems, apparatuses, and computer-readable media for decentralized service placement.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

According to some embodiments, multi-component service placement in a resource pool is enabled using distributed techniques. In some embodiments, service requests specifying resource requirements for multiple components of the service—and possibly location or affinity constraints for the service and/or for particular components—are received and passed down through a hierarchy of agents, where leaf agents in the hierarchy can generate, based upon the service requests and a set of resources available at one or more computing devices associated with the particular leaf agent, one or more solution encodings indicating possible (e.g., viable) placements of some or all of the components of the service request that the one or more computing devices can locally provide while satisfying the resource requirements of the some or all of the components. The generated solution encodings can be passed back up through the hierarchy, and can be consolidated (or aggregated) by the intermediate agents before being further passed up in the hierarchy. The root agent can receive one or more solution encodings from one or more other agents in the hierarchy acting as children of the root agent, and based upon these solution encodings, the root agent can quickly and accurately determine whether the particular corresponding service request may or may not be fulfilled, can identify a complete set of possible placements for the service that satisfies the stated resource requirements and satisfies any constraints placed upon the service or individual components.

Accordingly, embodiments solve the service placement problem in the context where a virtual infrastructure is requested to be placed on some resource pool, which can be a datacenter that is part of or the entirety of a computing cloud, computing grid, computing cluster, etc. Thus, the resource pool can be a "physical" resource pool (e.g., a set of processing resources such as those provided by one or more server end stations), or can be a "virtual" resource pool and provide access to non-physical resources. Moreover, the described embodiments are highly scalable, thereby allowing efficient placement in very large datacenters and in large distributed clouds.

Several factors contribute to the high scalability of these embodiments. In some embodiments, the system can be fully distributed and the various determinations can be executed in parallel using, for example, only locally stored information detailing available resources to make placement decisions. Accordingly, the footprint of various implementations of certain embodiments is very small and can easily be deployed and executed on each local physical resource, for example, in the hypervisor of a physical server or in the control plane of a network aggregation switch. Thus, new physical resources (e.g., a new server computing device or new rack(s) of server computing devices, etc.) can be added to a system and immediately be able to contribute to placement decisions while adding little or no extra burden in the placement process, as they will only take care of their own part by performing local determinations for service requests.

Some embodiments require neither a comprehensive monitoring mechanism nor a global database containing information of system-wide available resources for making placement decisions.

Additionally, the encoding and search scheme used in some embodiments scales very well when adding new resource requirements in service requests. For example, a request containing requirements on the number of Central Processing Unit (CPU) cores and/or memory size will take almost the same time to process as a request containing only requirements on the number of CPU cores. This holds true as in some embodiments the resource requirements are constrained to have additive properties.

Moreover, various embodiments will not provide any false negative or false positive answers. The entire search space will be searched in a very efficient way, and if a feasible solution exits, it will be found. Furthermore, if no feasible solution exists, the disclosed embodiments will be able to detect that very quickly.

Additionally, the disclosed embodiments can consider a service request as a whole while accounting for any type of affinity and co-location requirements associated with different components of the service. In other words, no matter how complex the affinity requirements are, the disclosed embodiments are able to find the feasible set in a very timely manner, as the methodologies and procedures utilized in these embodiments are mathematically sound and utilize "light" computational operations.

Further, the disclosed embodiments do not depend on the physical placement of the agents. Therefore, depending on the physical placement of the agents, there are many possible embodiments. For example, some embodiments utilize a fully-distributed deployment, where an agent can be assigned and co-located with each computing device (e.g., each physical server, aggregate switch, routers, etc.) in the cloud providing resources for services. Additionally, some embodiments utilize a semi-distributed deployment, where each agent can be assigned to a group of physical resources and perhaps be executed geographically close to these resources (e.g., within a same data center or rack). Additionally, some embodiments utilize a centralized deployment, where agents can be organized similar to the semi-distributed deployment, but the agents can be executed in one (or more) physical server computing device(s). Thus, the placement of agents is not limited to the described embodiments, and a variety of deployment possibilities exist and will be known or easily determined by those of skill in the art based upon an understanding of this disclosure.

Additionally, embodiments can process and place multiple service requests at the same time via the same logic utilized for placement pattern extraction using affinity and colocation rules without any loss of generality. That is, multiple service requests can be easily bundled together as separate equivalence classes (e.g., each of which having its own sub-equivalence classes like affinity, colocation, and resource groups) of a single large query that can be processed and placed partially or as a whole. In this sense, partial placement means that only a subset of the bundled queries may be successfully placed, whereas placement in whole refers to the successful placement of all service placement queries that form the bundle For further detail, we turn to FIG. 1, which is a high-level block diagram 100 illustrating distributed processing for decentralized service placement across one or more data centers 112A-112N (which may or may not be geographically separated) according to some embodiments.

In various embodiments, a set of computing resources (e.g., a cloud) can be viewed as a hierarchical resource tree regardless of whether it includes resources of only a single data center (e.g., 112A), or resources of a set of connected datacenters assembled into a distributed cloud (e.g., 112A-112N). The resource tree can be viewed as an abstract model where each node in the resource tree can be associated with a corresponding physical entity in the cloud infrastructure. Each node comprises an agent (104, 106, 108), and thus the hierarchical resource tree can be viewed as a hierarchy of agents 150, where particular agents can manage and/or execute the different phases of service placement as described herein.

The agents (104, 106, 108) can potentially execute in parallel (i.e., simultaneously or at least partially simultaneously), and in some embodiments each agent is configured to communicate only with its parent agent or its children agent(s). In some embodiments, though, agents can communicate with its "siblings" (i.e., other agents acting at a same level of the hierarchy) as well, sharing information if needed. Further, in some embodiments, agents can bypass one or more levels of the tree in either direction.

Agents will have different roles depending on their place in the resource tree and the physical resource that they may or may not be associated with. Furthermore, each agent may locally maintain information about available resources on the physical resource associated with it, and can make local decisions based on this data it has available to it. As the agents are placed as nodes in hierarchy 150, an agent can be a root agent 104 and thus having only children, an intermediate agent 106 having both a parent and children, or a leaf agent 108 having only a parent.

In some embodiments, the agents communicate with messages, and in some embodiments the agents can be configured to utilize predefined timeouts to control the time they will wait for requested solutions before proceeding.

Thus, in FIG. 1, a client 102 provides a service request 120 at circle '1', that is ultimately received (e.g., directly from client 102, or indirectly via another entity) at the root agent 104 at circle '2'. The root agent 104 can comprise a software module (e.g., an application, a process, a virtual machine) executed by an electronic device 110A such as a server computing device. The service request 120, in some embodiments, can be received from a user acting on the behalf of a cloud tenant, or another subsystem in the cloud. In some embodiments, a client 102 issues a request via a web portal or Application Programming Interface (API) (such as a Web Service), and the service request 120 can thus be provided to the root agent 104 by the web portal or API endpoint. In other embodiments, the client 102 can be a software module that issues the service request 120 programmatically, and thus, the service request 120 need not be directly caused to be issued by a human.

The service request 120, in some embodiments, includes a specification of the requirements of all resources needed by (or requested for) the desired service. For example, the service request 120 can include a description of a required processing resource units (e.g., a number of CPU cores, a number of encryption processors, a number of Graphics Processor Units (GPUs)), an amount of memory, an amount of storage, a number of network interface units (e.g., physical ports, virtual ports, etc.) each component of the service requires.

In some embodiments the service request 120 can include requirements about allowed or prohibited geographical locations for some or all of the components to be deployed, and in some embodiments can include affinity constraints for the components. An affinity constraint can specify particular components of the service that must be placed together on one set of computing resources, and/or particular components that are not to be placed together. Further, in some embodiments, an affinity constraint can identify one or more of the components of the service that are not to be placed in particular execution environments. For example, an affinity constraint can specify that one or more of the components are not to be placed on hardware shared with a database server—regardless of whether it is part of the same service or not. As another example, an affinity constraint can specify that one or more of the service's components are not be placed on hardware shared by a particular other entity or organization (e.g., a competitor) or type thereof. Of course, these embodiments are not limited to these exact described types of resource requirements and service requests, and thus these examples are not to be viewed as limiting but rather as illustrative.

Upon receipt of a service request 120, the distributed service placement can include several phases. For example, in some embodiments, the placement includes four phases: (1) service request encoding and distribution, (2) feasible solutions exploration, (3) solution aggregation, and (4) final solution selection. In some embodiments, all agents in the hierarchy 150 can be configured to perform the four phases, and thus, the phases can be recursively applied at every agent in the resource tree, starting with the root agent 104. However, in some embodiments, only certain phases are performed by certain of the agents in the hierarchy 150 based upon the particular configured role of the agent. For example, in some embodiments a root agent 104 may perform only certain phases, an intermediate agent 106 may perform only certain ones of the phases, and/or a leaf agent 108 may perform only certain ones of the phases.

In the exemplary embodiment of FIG. 1, upon the service request 120 being received at circle '2' at the root agent 104 of the hierarchy 150, the first phase—"service request encoding and distribution"—begins with the received service request 120 being divided into two parts: basic resource requirements, and location and/or affinity requirements.

Additionally, in some embodiments the service request 120 can be assigned a unique request identifier in order to allow for services requests 120 to later be uniquely associated with solutions. For example, the use of service request identifiers can simplify, for example, handling solutions that are received late. The service request identifier can be a unique random number, a request sequence number, a value resulting from a hash function (or other one-way or two-way function) being applied to some or all data of the service request, or can be chosen by any other scheme easily selected by one of ordinary skill in the art.

In some embodiments, during phase one and represented at each circle '3A', if the agent is configured as a root agent 104 or an intermediate agent 106 it can distribute the service request 120 (or a derivation thereof, referred to herein and described later as a service request description) to one or more agents of the hierarchy 150 configured as its children. This distribution may be selective and occur, for example, depending on location requirements of the service request and the known locations of the computing resources associated with the sub-hierarchy of agents. For example, if a request has a location requirement stating that all resources must be located in Europe, the agent can be configured to not pass the service request 120 to children agents placed in North America.

Additionally, as indicated above, in some embodiments the data sent at circle '3A' can include that of multiple service requests 120 from one or more clients 102, which the system can attempt to place in parallel in somewhat of a "batch" manner. In some embodiments, multiple service requests can be easily bundled together as separate equivalence classes (e.g., each of which having its own sub-equivalence classes like affinity, colocation, and resource groups) of a single large query that can be processed and placed partially or as a whole.

In some embodiments, an intermediate agent 106 receiving a service request 120 from an agent "above" it in the hierarchy (i.e., an agent serving as a parent agent to it), the intermediate agent 106 may be configured to identify (or derive) the service request identifier, which in some embodiments it may persist or maintain in memory. In some embodiments, the intermediate agent 106 may also selectively determine which, if any, of its child agents (e.g., intermediate agents 106B-106C for intermediate agent 106A, intermediate agents 106D-106F for intermediate agent 106B, or leaf agents 108A-108C for intermediate agent 106D) that it will pass the service request 120 to. For clarity of explanation with regard to this illustrated embodiment, we assume that the service request 120 will be passed to all agents in the hierarchy 150; thus, at each circle '3B' the service request 120 is passed down to intermediate agents 106B-106C, at each circle '3C' the service request 120 is passed down to intermediate agents 106D-106F, and at each circle '3D' the service request 120 is passed down to leaf agents 108A-108C.

When a leaf agent 108 receives the service request at circle '4', in some embodiments it will perform phase (1) operations, and can first extract a pattern from the service request 120 that categorizes the components in the request to equivalence classes. In some embodiments where each agent is using the same pattern extraction logic, these patterns will be identical across all leaf agents 108. Equivalence classes of the pattern can be formed based on affinity requirements and resource requirement commonalities. In some embodiments, each equivalence class is then associated with a certain position in some data structure, for example, a position in a tuple or in a list. In some embodiments, though, each equivalence class can be assigned and associated with a unique identifier that is used to reference the equivalent class. Accordingly, the equivalence classes in the extracted pattern can be utilized to encode the resource requirements and affinities associated with different components of the request. Thus, these embodiments classify and encode the service requests as a whole in a way that allows for very efficient handling in all search phases.

In phase (2), each leaf agent 108 searches the partial solutions of the input request placement that can be afforded by its available resources 114, without compromising any stated affinity requirements. Finding the feasible partial solutions can include searching through all the subsets of the service request 120. Note that the power set, representing all the subsets of a service request 120, grows exponentially in the number and types of the equivalent classes or components of the request.

However, the leaf agents 108 can be configured to perform an efficient search by leveraging the anti-monotonicity property, also known as apriori or downward-closure property. This property guarantees that for any feasible partial solution of the request, all its subsets are also feasible. Therefore, every leaf agent 108 can be configured to find a set of feasible partial solutions such that no two solutions are subsets of each other, and all partial solutions comply with the affinity requirements. Each partial solution found by a leaf agent 108 is encoded as the number of components that can be placed from each equivalence class. This results in a more compact representation of the set of feasible partial solutions, which can be returned to the leaf agent's parent at each illustrated circle '5'. Notably, the encodings as representations of the feasible solutions have a set of key mathematical properties that can be leveraged during the following phases.

In phase (3)—at circles '6' and '8' and '10' and '12'— every parent agent receives the feasible partial solutions in the form of encodings from its children, and may temporarily store the solutions, merge the received solutions in order to obtain the feasible partial solutions that can be met by all of the children, and finally return the solutions to its parent, if one exists (e.g., at circles '7' and '9' and '11').

In some embodiments, agents acting as a root agent 104 or intermediate agent 106 can be configured to utilize a preset timeout value indicating an amount of time that it will wait for its child agents to return their encodings to create a timeout window. Accordingly, if this time window expires and some child agents have failed to reply with their encodings, the root agent 104 or intermediate agent 106 can be configured to proceed with merging what it has received, which can prevent dead locks in the system.

Additionally, in some embodiments the root agent 104 or the intermediate agent 106 may also be configured to "re-query" those of its child agents that failed to reply within the timeout window. Accordingly, in some embodiments, the agents can be configured to, upon failing to receive encodings from one or more of its child agents within the timeout window, re-query that child agent(s), restart the timeout window, and await the encodings. The agents may be configured to perform a re-query a preset number of times (e.g., 0 times, 1 time, 2 times, etc.).

In some embodiments, the merging is performed by the agent incrementally and according to the apriori property of the encodings, which produces very compact results. For example, the incremental merging can include merging the feasible partial solutions of the two first children. Next, the redundant partial solutions whose superset already exists in the results can all be deleted. Similarly, the procedure may repeat, where the results are again merged with the feasible partial solutions provided by all other children.

In some embodiments, an agent finding a complete solution can return the solution directly to the root agent 104. In some embodiments, the agent may instead pass the complete solution to its parent. If the root agent 104 is reached and no solution is found, it is certain that no feasible solution to the service request exists, and a true negative answer is reached. Otherwise, the process can continue with phase (4).

In phase (4)—e.g., circle '12'—the found solutions can be identified and used to generate resource reservation requests 130A-130N (at circle '13') that can be passed from the root agent 104 to the set of its children that have the particular requested resources. In some embodiments the root agent 104 can pass resource reservation requests 130A-130N directly to the agent that found a complete solution.

In many cases, it is likely that a solution's feasible set is very large. For example, if the complete solution is the outcome of merging several children's results, then there is possibly a large number of ways that the solution can be decomposed across those children. The agent may be configured to choose one decomposition and asks its children to allocate the resources according to that decomposition. Each agent, while selecting a placement from the feasible solutions, may use a first fit selection to perform the final placement. Of course, other embodiments may use other ways to select the final placement. For example, the placement can be selected based upon a directional preference (e.g., prefer to place requests "down-and-left" in the hierarchy 150), selected based upon a preference to place requests in certain data centers 112, etc.

For further detail, we turn to FIG. 2, which illustrates an example textual service request 200 (i.e., textual service request 120A) together with an example system 250 for decentralized service placement according to some embodiments.

The textual service request 120A provides a human understandable version of a service request 120 helpful in understanding the various embodiments, and thus, the service requests 120 utilized in actual systems may vary from this format. For example, many other formats of a service request 120 can be used that encode the same information in any number of more compact and easily computer-understood formats.

However, this illustrated textual service request 120A is for a service having six components 202. Each of the components 202 here includes one or more resource requirements 204 for the particular component. The resource requirements 204 here illustrated include processing requirements 208, memory requirements 210, and storage requirements 212; however, many other types of requirements can be utilized.

For example, some embodiments utilize requirement types having additive properties from the perspective of the process of computing encodings. For example, this additive property can be used such that if two processing resources are required for a service request 120 and an agent knows that the resources it controls can fulfill that requirement, it also knows that it can fulfill anything under two processing resources. In addition to processing, memory, and storage requirements, other resources also have this property, such as a number of network interfaces (physical, virtual, logical, etc.). Therefore, in these embodiments, any other resource having such an additive property can be utilized.

The illustrated textual service request 120A also includes constraints 206. In this example, the first component has two affinity constraints—a co-location constraint indicating that it must be co-located with the second component, and a non-co-location constraint indicating that it must not be co-located with any of the fourth, fifth, or sixth components.

Thus, for this simple exemplary textual service request 120A, the "Component 1" has resource requirements of 2 Cores, 4 GB of Memory, and 1 TB of Storage, and constraints that it must be co-located with Component 2 and must not be co-located with Components 4, 5, and 6.

The "Component 2", in contrast, only has resource requirements of 2 Cores, 4 GB of Memory, and 1 TB of Storage. "Component 3" has resource requirements of 1 Core, 1 GB of Memory, and 1 TB of Storage, but also has a non-co-location constraint and must not be co-located with Components 1, 2, 4, 5, or 6.

The next three components of the requested service—Components 4, 5, and 6—all have identical resource requirements: 1 Core, 2 GB of Memory, and 2 TB of Storage.

We will now present an exemplary decentralized service placement for this illustrated textual service request 120A with regard to exemplary system 250. Exemplary system 250 presents a simple hierarchy with a root agent 104 having two child intermediate agents 106S-106T (executed at electronic devices 110S-110T, respectively). Each intermediate agent 106S-106T includes four child leaf agents (108U-108W, and 108X-108Z). In this example, we assume that each leaf agent (e.g., 108X) is executed by an electronic device (e.g., 110X, which may be a server computing device) having a same set of available resources 114X: 8 processing cores 250X-1, 16 GB of memory 250X-2, and 4 TB of non-volatile storage 250X-3. Of course, in many deployments, the electronic devices 110 and/or resources 114 are heterogeneous. Further, for this example, we assume that all of the resources 114 are available for service placement—in many scenarios, the set of available resources will be smaller than the set of total resources due to other resource reservations and/or utilizations.

Figure 3:
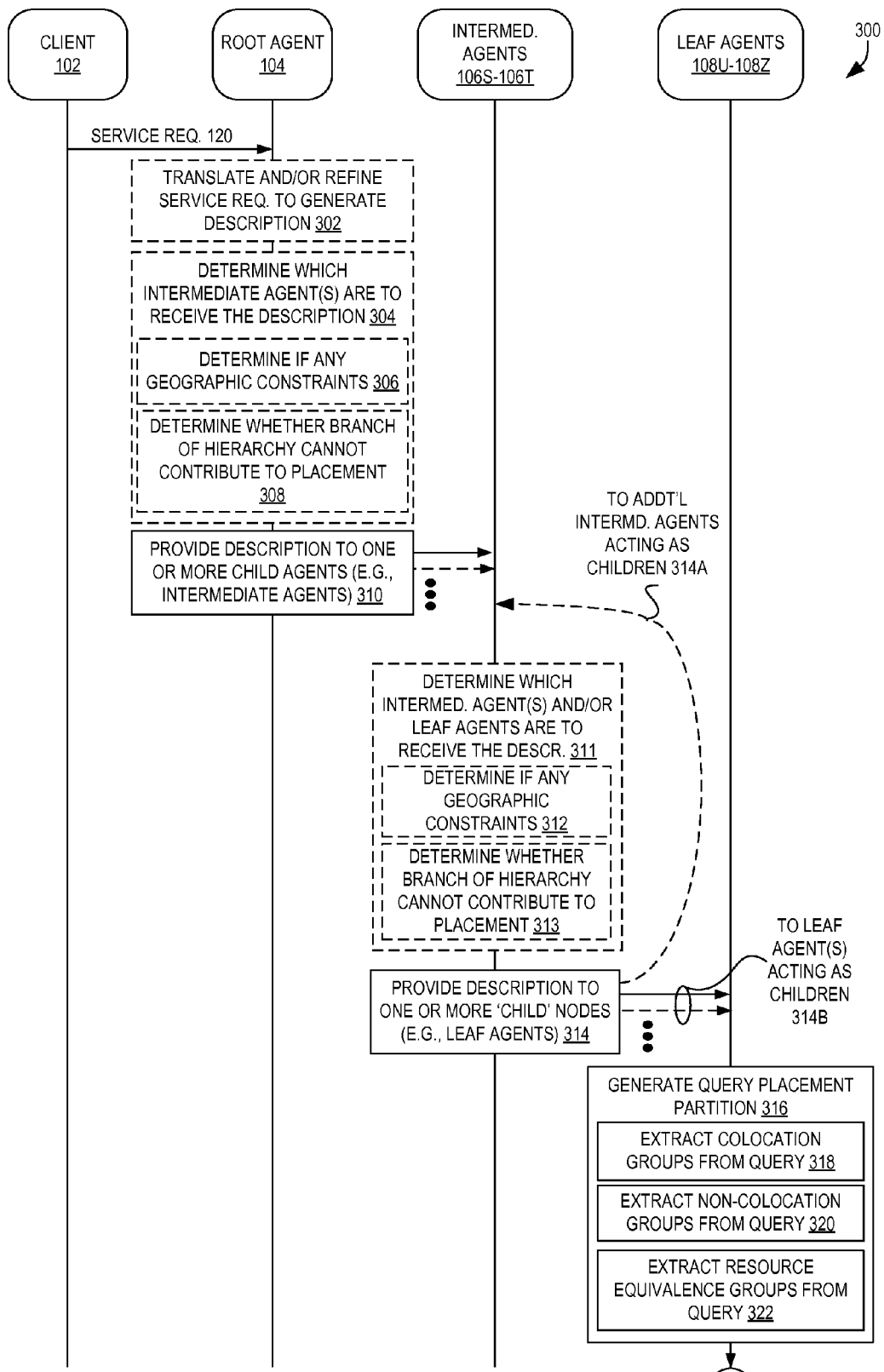
FIG. 3 is a combined sequence and flow diagram illustrating message flows between and operations performed by a client and the agents illustrated in FIG. 2 for performing decentralized service placement according to some embodiments.

To explore the exemplary decentralized service placement example, we turn to FIG. 3, which presents a combined sequence and flow diagram illustrating message flows between and operations performed by a client 102, root agent 104, intermediate agents 106S-106T, and leaf agents 108U-108X (as illustrated in FIG. 2) for performing decentralized service placement according to some embodiments.

In this example, the client 102 provides a service request 120, which arrives at root agent 104 directly or via another entity (e.g., a web portal, API endpoint, etc.). In some embodiments, the root agent 104 will optionally (at block 302) translate and/or refine the service request to generate a service request description.

Figure 5:
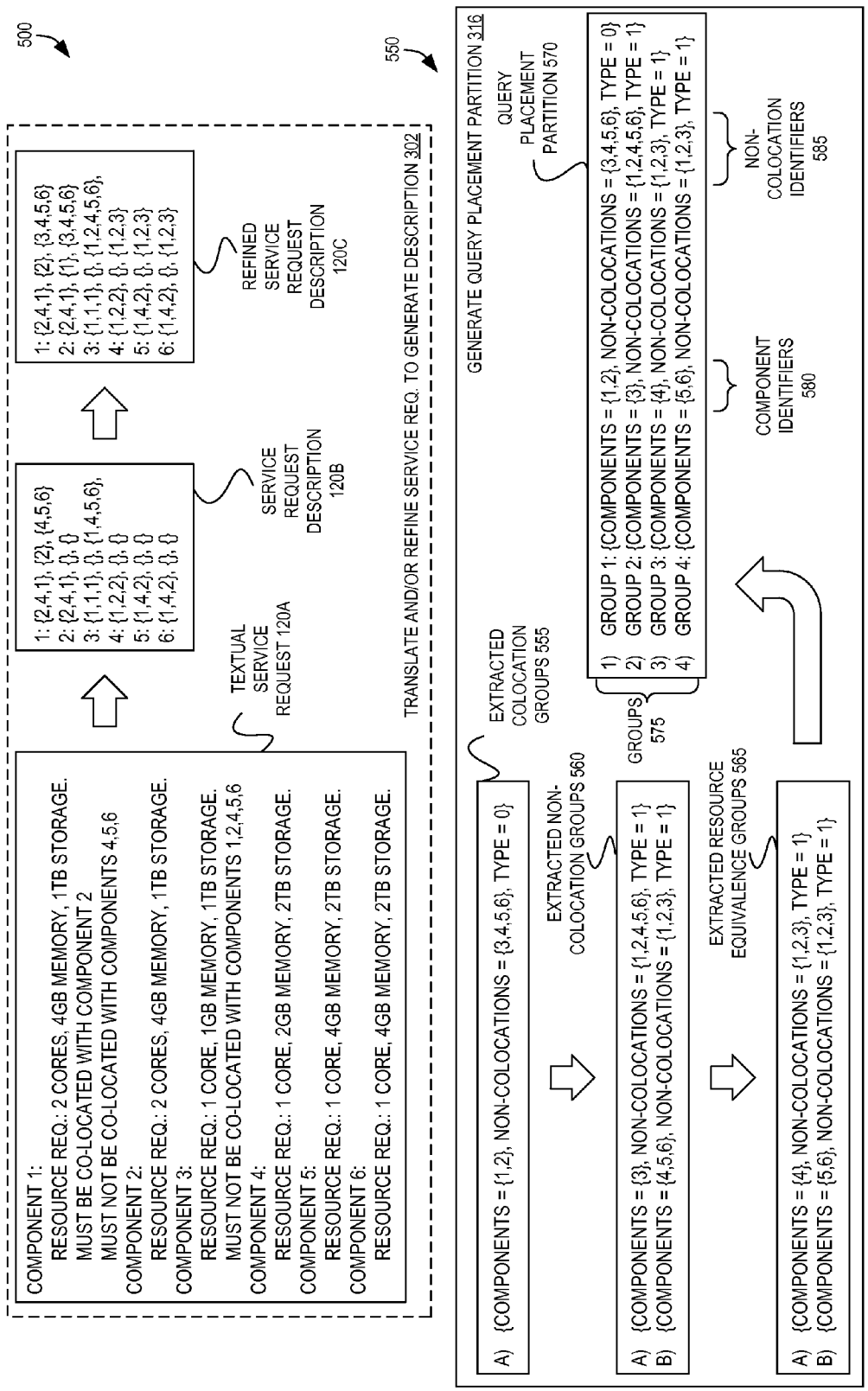
FIG. 5 is a block diagram illustrating translation and refinement of service requests and query placement partition generation as performed for decentralized service placement according to some embodiments.

An example of translation and/or refinement is presented with regard to FIG. 5, which is a block diagram illustrating translation and refinement of service requests (500) and query placement partition generation (550) as performed for decentralized service placement according to some embodiments.

In some embodiments, block 302 can include transforming the textual service request 120A into a service request description 120B according to a machine-friendly format. For example, the data of the text service request 120A can be written according to the following format, where C stands for a component identifier:

<C>: requirements={Cores, Memory, Storage}, colocations={<C>}, non-colocations={<C>}

Hence, the service request description 120B of the textual service query 120A given above can be denoted as:

1: {2,4,1}, {2}, {4,5,6}
2: {2,4,1}, { }, { }
3: {1,1,1}, { }, {1,4,5,6},
4: {1,2,2}, { }, { }
5: {1,4,2}, { }, { }
6: {1,4,2}, { }, { }

As can be seen, the affinity symmetry with respect to colocation and non-colocation is not provided in the service request description 120B. Thus, in some embodiments, the service request description 120B can be refined in order to reflect the necessary symmetry. For instance, Component 1 having to be on the same physical machine with Component 2 also implies that Component 2 must be on the same machine as Component 1. The same two-way implication (or "iff" relation) also applies to non-colocation. Also, Component 2 must also inherit all non-colocation constraints of Component 1 and vice versa. Further, each component that has Component 1 as a non-colocation constraint can be updated to have Component 2 as a non-colocation constraint as well. Once the symmetry is attained, the refined service request description 120C is:

1: {2,4,1}, {2}, {3,4,5,6}
2: {2,4,1}, {1}, {3,4,5,6}
3: {1,1,1}, { }, {1,2,4,5,6}
4: {1,2,2}, { }, {1,2,3}
5: {1,4,2}, { }, {1,2,3}
6: {1,4,2}, { }, {1,2,3}

Turning back to FIG. 3, the flow can continue with the root agent 104 optionally determining, at block 304, which intermediate agent(s) are to receive the service request description (120A, 120B, or 120C). For example, in some embodiments, the root agent 104 can determine, at block 306, whether the service request 120 includes a geographic constraint indicating physical (or virtual) locations where one or more (or all) components of the requested service may or may not be placed. For example, a constraint for a service request 120 could specify that all components of a service must be placed within North America, or that two of the components of a service must not be placed within either Germany or the state of Texas.

Block 304 can also include determining, at block 308, whether a particular branch of the hierarchy cannot contribute to a placement of some or all of the components of the service request 120. For example, a root agent 104 may be configured with data specifying geographic locations associated with each of its child agents (e.g., intermediate agents 106S-106T). The root agent 104 can then, perhaps based upon a geographic constraint of the service request 120, determine whether one (or more) of its child agents can be skipped (or "pruned") from the distributed service placement due to that child agent—and its descendent agents—being unable to provide any assistance with the placement. Continuing the preceding example where all components of a service must be placed within North America (per a geographic constraint of the service request 120), it could be the case where a first child agent (e.g., intermediate agent 106S) serves as a "root" of a sub-tree of agents for North America, and the second child agent (e.g., intermediate agent 106T) serves as a "root" of a sub-tree of agents for Europe. In this case, the root agent 104 can determine that only the first child agent is to receive the service request description, and that the second child agent is not to receive the service request description.

Notably, it is also possible that at block 304, the root agent 104 could determine that none of its child agents should be recipients. For example, the root agent 104 could determine that a constraint provided with a service request 120 eliminates all of the sub-trees associated with each of its child agents from being placement candidates. Thus, in some embodiments the root agent 104 can determine that it is unable to accommodate the service request 120, and possibly report this failure back to the client 102 and end the flow.

However, in some embodiments the root agent 104 provides, at block 310, the service request description to some or all of its child agents. In some embodiments, the root agent 104 can provide the service request description to all of its child agents, but in some embodiments, the root agent 104 may potentially provide the service request description to a subset of its child agents—e.g., those agents determined to be recipients per block 304.

Optionally, each of the intermediate agents 106S-106T can be configured to, at block 311, determine which of its child agents (e.g., additional intermediate agents or leaf agents) are to receive the description. Block 311 can include similar operations as described with regard to block 304—thus, the intermediate agents 106S-106T can optionally, at block 312, determine if there are any geographic constraints associated with the service request 120, and optionally at block 313 determine whether a branch (or sub-tree) of the hierarchy associated with one or more of its children agents cannot contribute to any placement of any of the components of the service request.

Accordingly, the intermediate agents 106S-106T may or may not provide the service request description (at block 314) to all of its child agents based upon the operations of block 311. In embodiments where there are multiple levels of intermediate agents, some or all of the intermediate agents 106S-106T may pass the service request description to additional intermediate agents acting as children agents at line 314A. In some embodiments, such as the example system of FIG. 2, the intermediate agents 106S-106T pass the service request description to leaf agents 108U-108Z at line 314B.

Although not illustrated, in some embodiments the leaf agents 108U-108Z can also perform operations similar to those disclosed with regard to blocks 304 and 311, which can allow the particular leaf agents 108U-108Z to determine whether they should even attempt to determine which solutions, if any, they can provide. For example, if a geographic constraint indicates that no component should be placed in the United States, and the particular agent is associated with resources within that country, the agent can be configured to avoid further solution searching and instead report back (to its parent agent, to a root agent, etc.) that it cannot provide any solutions without having to examine the particular resource requirements of the requested service.

However, continuing with the flow, we now step to blocks 316 and 402 (of FIG. 4), in which the leaf agents 108U-108Z utilize the service request description to determine a representation of all possible solutions that the associated computing resources (e.g., a server computing device) can provide in hosting the service request in part or in full. Note that, if it can be ensured that the representations of each agent's solution space is compatible (meaning they follow the same pattern), then it will be possible to merge these generic descriptions quickly up the network. In order to ensure that these are compatible representations, the agents can be configured to tightly stick with the data given by the service request description as it will reach and be common to every leaf agent. Accordingly, in some embodiments the shared service request description and a common logic (implemented at each agent) can be used to extract a common pattern for solution representations. This pattern can be common to all agents in the hierarchy throughout the resolution of the placement query. Accordingly, this process can be viewed as a common protocol used to articulate how each individual resource unit can assist in solving the placement problem.

In some embodiments, block 316 is performed to first generate a query placement partition. In some embodiments, this includes extracting colocation groups from the service request description (or "query") at block 318, extracting non-colocation groups from the query at block 320, and/or extracting resource equivalence groups from the query at block 322. For additional detail regarding block 316, we again turn to FIG. 5, which illustrates operations 550 for generating a query placement partition 316, which can be performed by each of the leaf agents 108U-108Z.

Query placement partition generation can begin with extracting 318 colocation groups 555, each of which identifies a grouping of components that are to be executed together (i.e., be "colocated"). In the ongoing example, there is a single colocation group with Component 1 and Component 2, as the constraints 206 of the first component indicate "Must be co-located with Component 2" (see textual service request 120A). For convenience, we can denote this group using the following format, where the term "components" denotes the set of identifiers of the components in the colocation group, and the term "non-colocations" denotes the set of identifiers of components than cannot be colocated with the components in the colocation group:
{components={1,2}, non-colocations={3,4,5,6}, type=0}

A colocation group can be defined as a set of components where the union of each component's colocation constraints is identical to the colocation group itself. In the example, we also use "type=0" as a flag indicating that this is a colocation group and the components in it must either be placed all together or not at all. Of course, this flag and this particular notation need not be precisely followed in all embodiments.

Query placement partition generation can also include extracting 320 non-colocation groups 560. This can occur by identifying, from the components remaining in the query after the extraction of colocation groups, sets of components that have the same set of non-colocation constraints. Accordingly, the example query has two non-colocation groups:
{components={3}, non-colocations={1,2,4,5,6}, type=1}
{components={4,5,6}, non-colocations={1,2,3}, type=1}

Once again, "type=1" indicates that these are non-colocation groups, and thus, the components in them can be placed in any quantity. This first non-colocation group is for component 3, which has constraints indicating that it cannot be co-located with any of components 1, 2, 4, 5, or 6. The second non-colocation group is for components 4, 5, 6, each of which having a same set of non-colocation constraints (i.e., no component-specified co-colocation constraints, but each having inherited co-location constraints due to the non-colocation constraints of components 1 (and inherited by 2) and 3). Thus, each of components 4, 5, and 6 have a same set of non-colocations with components 1, 2, and 3.

Query placement partition generation can also include extracting 325 resource equivalence groups 565 from each of the non-colocation groups 560. A resource equivalence group 565 can be defined as a set of components having identical resource requirements on all resource dimensions. In the example at hand, there exists only one such case—components 5 and 6 have the same resource requirements in all dimensions (e.g., the same processing, memory, and storage requirements), but these are different than the resource requirements of component 4 because it requires less memory (i.e., 2 GB instead of 4 GB). Accordingly, this results in extracting:
{components={4}, non-colocations={1,2,3}, type=1}
{components={5,6}, non-colocations={1,2,3}, type=1}
(from {components={4,5,6}, non-colocations={1,2,3}, type=1})

Accordingly, based upon combining data from the extracted colocation groups 555, non-colocation groups 560, and resource equivalence groups 565, the following query placement partition 570 is generated with four groups 575, each group having a set of one or more component identifiers 580 and zero or more non-colocation identifiers 585:
Group 1: {components={1,2}, non-colocations={3,4,5,6}, type=0}
Group 2: {components={3}, non-colocations={1,2,4,5,6}, type=1}
Group 3: {components={4}, non-colocations={1,2,3}, type=1}
Group 4: {components={5,6}, non-colocations={1,2,3}, type=1}

Figure 4:
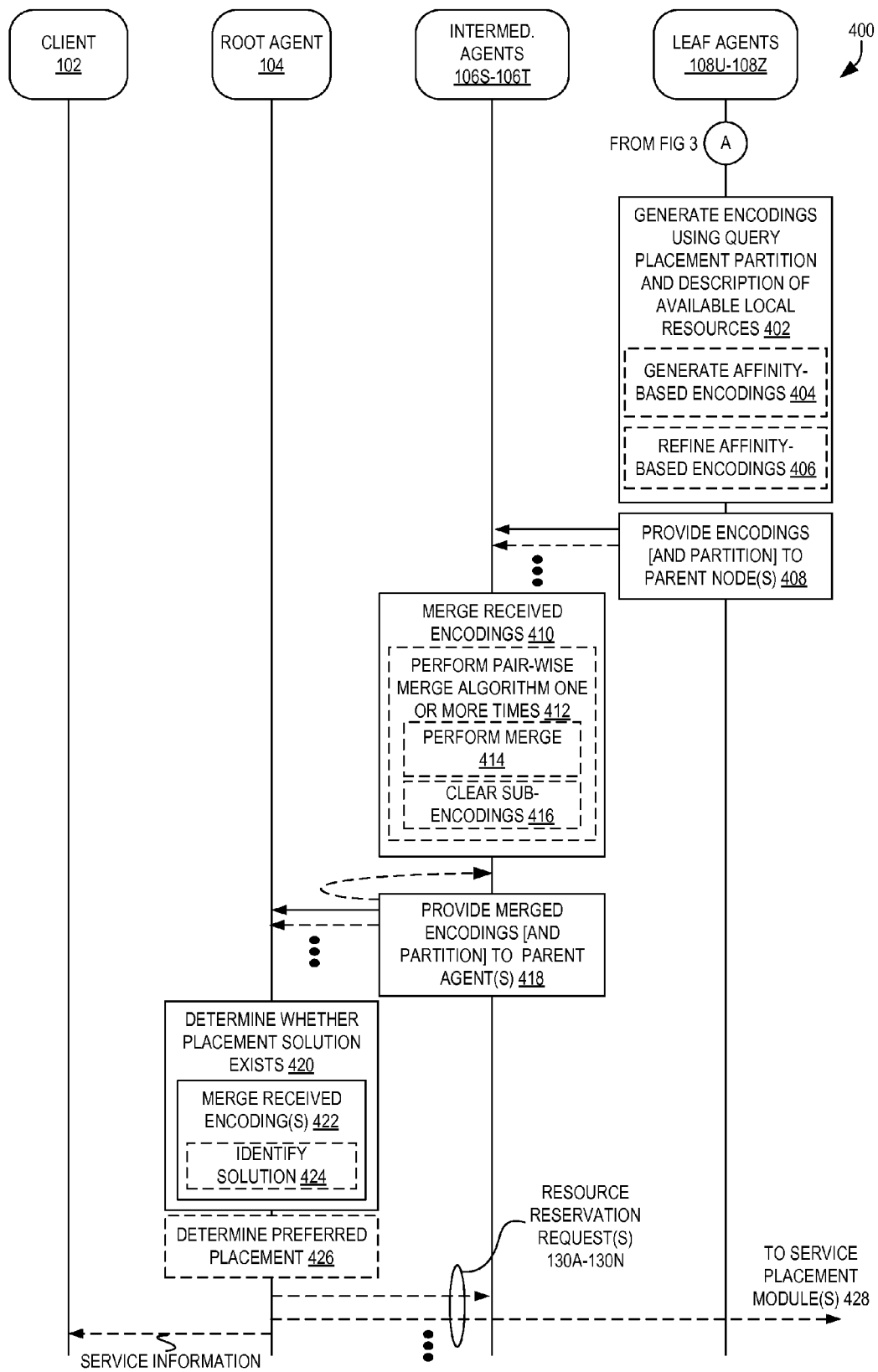
FIG. 4 is a combined sequence and flow diagram continuing the message flows and operations depicted in FIG. 3 for decentralized service placement according to some embodiments.

With the query placement partition 570, the overall flow can continue with encoding generation at block 402 of FIG. 4, which is a combined sequence and flow diagram continuing the message flows and operations depicted in FIG. 3 for decentralized service placement according to some embodiments.

Once the query placement partition 570 (or "pattern") is computed at a leaf agent (e.g., leaf agent 108U), a set of encodings is generated at block 402 based on what can be placed by the resources (e.g., 104U) of one or more electronic devices (e.g., 110U, which can be server computing devices) associated with the leaf agent 108U, from a strictly "local" point of view (i.e., only in view of the "local" resources 114U of that set of electronic devices 110U, ignoring the resources (e.g., 104V-104Z) of all other electronic devices (110V-110Z) in the system). Thus, in some embodiments the query placement partition 570 pattern will be common/identical across the data center, but the encodings generated based upon that pattern (and computed at each leaf agent) can be different, but nonetheless compatible.

As additional system variants, in some embodiments the root agent 104 may generate the query placement partition 570 instead of the leaf agents and pass this to the leaf agents, and in some embodiments another entity (e.g., the client 102 or another system) generates the query placement partition 570 and provides it to the root agent 104 to be distributed throughout the hierarchy to the leaf agents, which then can generate encodings based upon their individual views of their local resource availabilities and capabilities.

Figure 6:
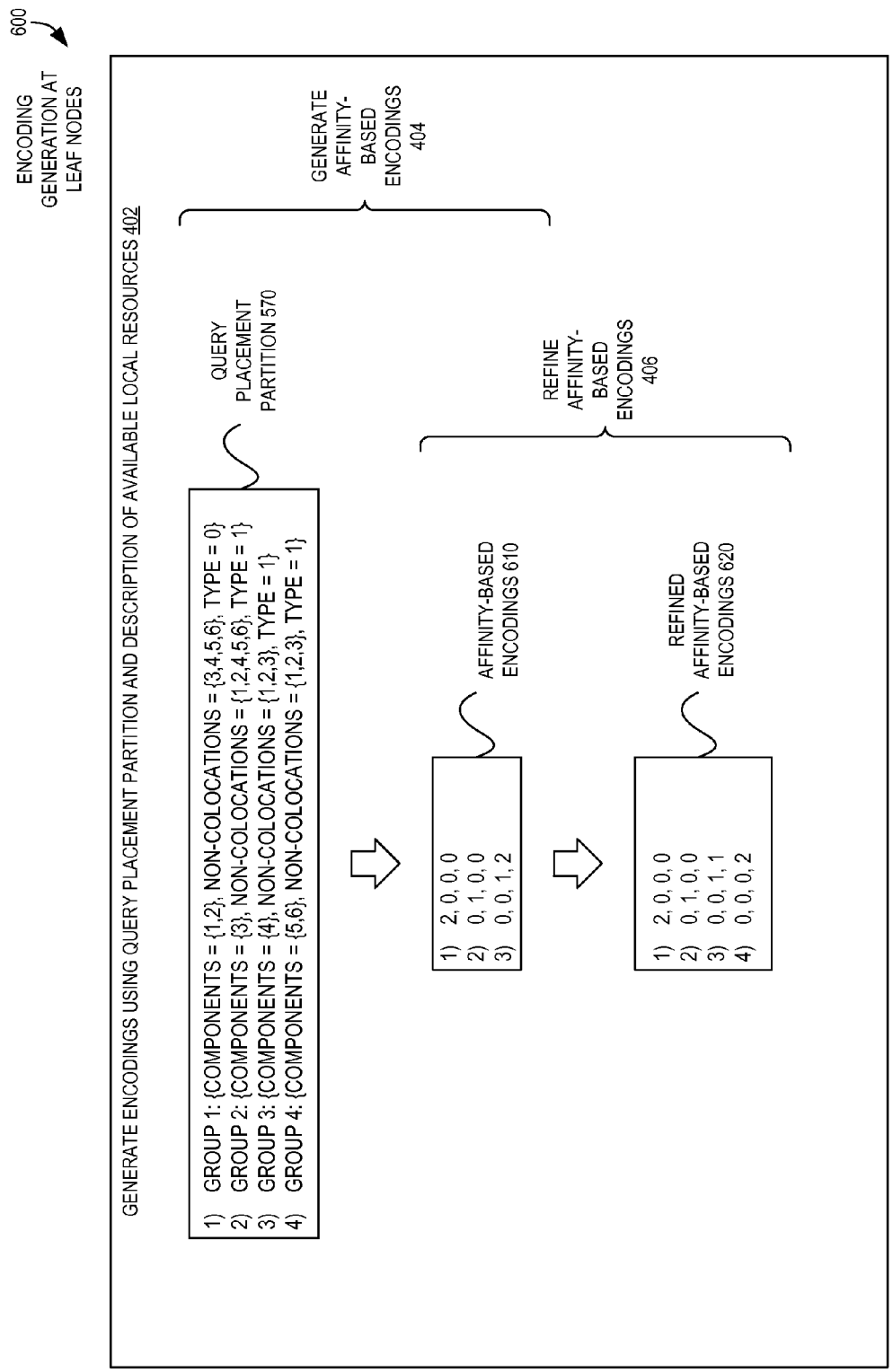
FIG. 6 is a block diagram illustrating encoding generation performed at leaf agents as part of decentralized service placement according to some embodiments.

An example computation of possible encodings using the generated query placement partition occurring at a leaf agent that governs the resources of associated resources will now be provided with regard to FIG. 6, which is a block diagram illustrating encoding generation 600 performed at leaf agents as part of decentralized service placement according to some embodiments.

In some embodiments, block 402 (i.e., the generation of encodings using the query placement partition and description of available local resources) generates encodings using a pattern {W, X, Y, Z}. In this pattern, each letter denotes the number of elements that can be selected from the Groups 1, 2, 3, and 4, respectively, based upon a placement scenario.

For this example, we assume that each of the electronic devices in the data center has the same available resources 114U-Z: {8 Cores 250U-1, 16 GB Memory 250U-2, 4 TB Storage 250U-3} available.

Each leaf agent can first generate 404 the affinity-based encodings 610 of {W, X, Y, Z} as follows:
Encoding 1—{2, 0, 0, 0}. Components from Group 1 mapping to W must always be placed together or not at all. When doing a placement from Group 1, no placements from the other groups can be done, as each and every one of the components in the remaining groups are in the non-colocation constraints of Group 1. Hence, the encoding of X, Y, Z as 0, 0, 0, which yields the total {2, 0, 0, 0}.

Encoding 2—{0, 1, 0, 0}: Assuming a placement of the one component of Group 2, we get a "1" for X. Next, because the component from Group 2 cannot be co-located with any of the other components from the other groups, W, Y, Z take value 0.

Encoding 3—{0, 0, 1, 2}: Components from Groups 3 and 4 cannot be co-located with components from the other groups, however, there are no restrictions on their joint placement. Thus, we generate a single encoding for all of these components of groups 3 and 4.

In some embodiments, encodings such as {0, 0, 1, 1} are not included in the resulting encodings. The reason is because {0, 0, 1, 1} is a sub-encoding of one or more of the set of three encodings given above. An encoding "e1" is a sub-encoding of another encoding "e2" if column-wise subtraction of e1 from e2 gives an encoding with all non-negative values. In this case for instance {0,0,1,1} is a sub-encoding of {0,0,1,2}, as column-wise (e2-e1) yields {0,0,0,1}, which includes all non-negative values. In these embodiments, such sub-encodings are not considered as uniquely representative of the solution set as they can be trivially derived from one of their super-encodings. An encoding is deemed uniquely representative of the solution space if it is not a sub-encoding of any of the other encodings of the solution space. Note that all three encodings given above are uniquely representative of the solution space, although they may be representing intersecting portions of the solution space. Two encodings are deemed unique from one another if their column-wise subtraction yields a mix of negative and non-negative numbers. It can be seen that this applies to all of the three encodings computed above.

In some embodiments, the affinity-based encodings 610 are further refined 406 to correctly represent the solution space in terms of what can be effectively placed with respect to total local resources available at the electronic devices associated with the agent. The process of refining is undertaken as follows:

The first affinity-based encoding {2,0,0,0} yields a total resource requirement of {4 Cores, 8 GB Memory, 2 TB Storage}, which can be supported given the available local resources of {8, 16, 4}. Hence {2,0,0,0} is a refined encoding already, and remains in the refined set of affinity based encodings 620.

The second affinity-based encoding {0,1,0,0} yields a total resource requirement of {1 Cores, 1 GB Memory, 1 TB Storage}, which can be supported given the available local resources of {8, 16, 4}. Similarly, {0,1,0,0} is a refined encoding already, and remains in the refined set of affinity based encodings 620.

The second affinity-based encoding {0,0,1,2} yields a total requirement of {3 Cores, 10 GB Memory, 6 TB Storage}, which cannot be satisfied by the available local resources (as the 4 TB of local storage does not satisfy the 6 TB of requested storage). Thus, two "subsets" of {0,0,1,2} can be found that can be satisfied are {0,0,1,1} and {0,0,0,2}. Note that these two subsets are uniquely representative with respect to one another. Also, an important note to make here is that, these subsets can be trivially calculated by bounding each part of the encoding with the maximum number of placements that can be made from a single group. Once these upper bounds are computed, they provide an efficiently pruned solution space to search in. Hence, the uniquely representative sub-encodings of an affinity encoding can be computed very fast.

Accordingly, the refining process 406 results in four encodings, namely {2,0,0,0}; {0,1,0,0}; {0,0,1,1}; and {0,0,0,2}. These encodings cover all possible placements of the service request description query on the set of associated electronic devices entirely based on their local available resources.

Note that in various embodiments, the definition of an "available" resource can be different and formulated in a variety of ways known to those of skill in the art. In some embodiments, an amount of available resource can be determined by subtracting an allocated/reserved amount of the resource from a total amount of resources made available for allocation. For example, a server computing device could have total storage of 10 TB, where 9 TB is made available for service placement, of which 6 TB may already be allocated. Thus, 3 TB of storage can be deemed as "available." Thus, in various embodiments, the refinement 406 of the affinity-based encodings can be based upon knowledge (by the agent) of the available resources of its associated electronic device(s). There are a variety of ways of the agent acquiring this availability information, such as through reporting, polling, and/or on-demand request mechanisms known to those of skill in the art.

Turning back to FIG. 4, once the refined encodings (and optionally, the pattern description) are computed at each leaf agent, they can be passed "upward" in the hierarchy at block 408 to the parent agent that the service request description (or "query") was received from.

Figure 7:
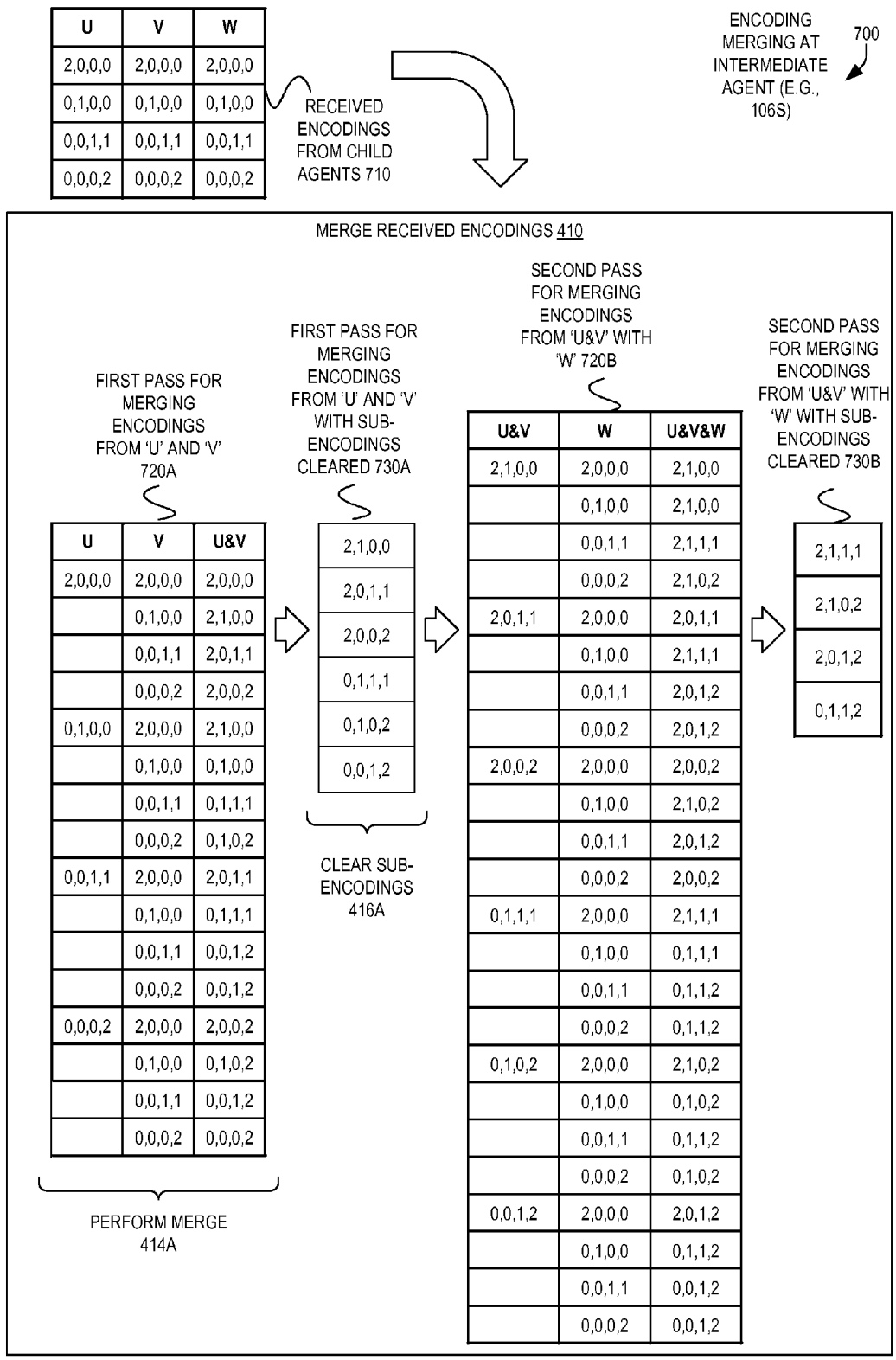
FIG. 7 is a block diagram illustrating encoding merging performed at intermediate agents as part of decentralized service placement according to some embodiments.

The recipient agent (e.g., 106S), upon receiving the set of encodings from each of the agents that it transmitted the query to, can compute a combined solution from the received encodings by merging the received encodings at block 410. For further detail, we turn to FIG. 7, which is a block diagram illustrating encoding merging performed at intermediate agents as part of decentralized service placement according to some embodiments.

For simplicity's sake (and without loss of generality), assume that all leaf agents 108U-108W (referred to herein as U, V, and W) return the exact same encodings to intermediate agent 106S. Accordingly, intermediate agent 106S receives the encodings from its children agents D, E, and F as summarized in the combined table of "received encodings from child agents" 710.

In some embodiments, the merging of the received encodings 410 begins by combining the results from U & V in a "first pass" 720A by performing column-wise addition with each pair of encodings, making sure that a column does not yield a number of components from a group that exceeds the total number of components in that group. For example, the first combination of {2,0,0,0} from U and {2,0,0,0} from V would result in U&V={2,0,0,0}—not {4,0,0,0}. The full process for merging 414A encodings from U and V is summarized in the "first pass" table 720A.

In some embodiments, the initial merged encodings (i.e., the right-hand column of table 720A) can be reduced by clearing 416A the existing sub-encodings, which results in table 730A. To reiterate, an encoding "e1" is a sub-encoding of another encoding "e2" if column-wise subtraction of e1 from e2 results in an encoding with all non-negative values. In this case, for instance, the first merged U&V encoding "e1" of {2,0,0,0} is a sub-encoding of at least the second encoding "e2" {2,1,0,0}, as column-wise (e2-e1) yields {0,1,0,0}, which includes all non-negative values. Thus, the first merged U&V encoding "e1" of {2,0,0,0} can be pruned. After all pruning has occurred, the result is the table 730A, indicating the result of the first pass for merging encodings from U and V with sub-encodings cleared.

This result can then be merged with the received encodings from W, as summarized in the second pass for merging encodings from U&V with W in table 720B. Once the sub-encodings are cleared, the result is table 730B, which reflects the second pass for merging encodings from U&V with W with the sub-encodings cleared. Accordingly, this intermediate agent has generated four solution encodings indicating the possible placements that the electronic devices 110U-110W associated with its children leaf agents 108U-108W can provide: {2,1,1,1}, {2,1,0,2}, {2,0,1,2}, and {0,1,1,2}. Turning back to FIG. 4, these merged encodings (and possibly the generated partition) is provided back to the parent agent(s) of the intermediate agent.

Continuing the example (with the exemplary system 250 of FIG. 2) in FIG. 4, the merged encodings are passed back to the root agent 104. We also assume that identical encodings are received from both intermediate agent 106S and also intermediate agent 106T, because they have the same resources per our earlier stipulation. Note, however, that in many embodiments the receipt of identical encodings from all child agents may be not be a common case.

At the root agent 104, the process can continue with block 420 for determining whether a placement solution exists for the service request 120. This block 420 can include a (at least partial or complete) merging of received encodings at block 422. During this process—even perhaps before the completion of all the merging—a solution may be identified at block 424. However, in some cases, it is possible that no solution can be found, and thus, the system is unable to place the service request.

Figure 8:
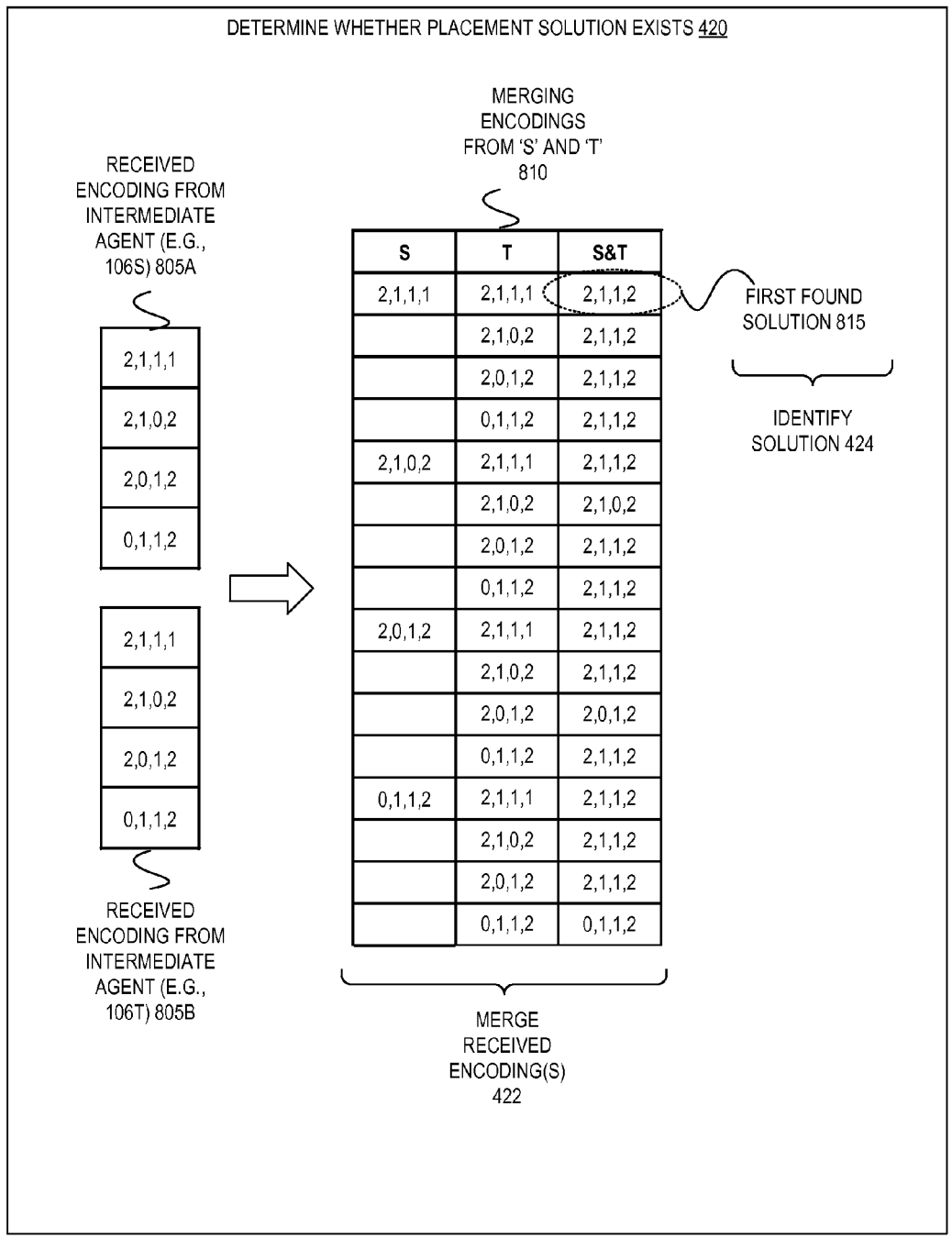
FIG. 8 is a block diagram illustrating encoding merging and solution identification performed at a root agent as part of decentralized service placement according to some embodiments.

For an example of block 420, we now turn to FIG. 8. FIG. 8 is a block diagram illustrating encoding merging and solution identification 800 performed at a root agent as part of decentralized service placement according to some embodiments. FIG. 8 includes a first received encoding 805A (from intermediate agent 106S, or "S") and a second received encoding 805B (from intermediate agent 106T, or "T"). As discussed, these encodings are the same due to the same resources of each subtree.

Thus, the two encoding sets for S and T can begin to be merged. Accordingly, the first encoding from S {2,1,1,1} and the first encodings for T {2,1,1,1} can be merged to yield {2,1,1,2}. In this case, this merged encoding can be deemed to be a first solution 815 due to a solution identification 424 process. For example, as each merge occurs (or after all merges occur, to thus yield table 810), the combined S&T encodings can be tested against the total requirements of the service request (e.g., from the query placement partition 570): group 1 has 2 components, group 2 has 1 component, group 3 has 1 component, and group 4 has 2 components. As this total requirement {2,1,1,2} is identical to the first merged encoding, we have determined that a solution exists. In contrast, if none of the merged encodings (in the S&T right-side column) were identical to the total requirement, then no such solution exists. Note, in some embodiments, no clearing of sub-encodings from S&T needs to be performed, though in some non-illustrated embodiments they are cleared.

Returning to FIG. 4, from this point on it is just a matter of which encodings are wanted to be used to do the actual placement. Thus, optionally the root agent 104 at block 426 can determine a preferred placement for the service, and optionally can send resource reservation requests to intermediate agents, which can send other resource reservation requests to its children (e.g., other intermediate agents or leaf agents), etc., and upon receipt by a leaf agent, the leaf agent can cause the reservation to occur for the service. In some embodiments, the root agent 104 can transmit one or more resource reservation requests 130A-103N to an external service placement module 428 such as a cloud orchestration/deployment tool.

Of note is that the selection of particular placement locations can be made in any number of places in the hierarchy, and can occur in multiple places in the hierarchy. For example, a root agent 104 simply issue generic resource reservation requests 130 to one or more of its children according to a scheme (e.g., send one request to just a first child agent), and these recipients themselves may issue resource reservation requests 130 (e.g., send a request to a first child agent and another request for the remainder of the service to a third child agent) down the hierarchy of agents according to a scheme, etc.

There are many different ways to determine the placement that can be used in various embodiments. For example, one approach could be to "lean" towards one direction in a data center, such that the placement command(s) will always be sent towards the maximum at a single direction and the complementary on the other(s). In the case illustrated in FIG. 8, where the solution 815 of {2,1,1,2} was computed from {2,1,1,1} from agent "S" and {2,1,1,1} from "T", the root agent 104 could, with a tendency towards the location of "S", attempt to send {2,1,1,1} towards "S" and the remainder (i.e., {0,0,0,1}) toward "T" (note that {0,0,0,1} is a subset of T's original {2,1,1,1} and therefore is trivially derivable). Similarly, upon receiving {2,1,1,1} from the root agent 104 (mapping to row 3 of U&V&W in Table 720B, and row 3 of U&V in Table 720A), could send it as {2,0,0,0} to "U", {0,1,0,0} to "V" and {0,0,1,1} to "W".

On the reverse side of the hierarchy, upon receiving {0,0,0,1} from the root agent 104, "T" can transmit it down to the agents that have {0,0,0,1} as a subset (which have already been found previously) following the same tendency. Hence the resource reservation (or placement) can be completed, and in this case, yields a distributed version of the well-known First-Fit Decreasing algorithm. However, as alluded to above, there are many other techniques for choosing particular placement locations that can be easily implemented by those of skill in the art and that fall under the scope of these embodiments.

Accordingly, the encoding method and the hierarchal architecture of these distributed service placement systems provide countless benefits. The encodings can allow each agent to perform very quick, light-weight computations and require only a small amount of memory to store the results. Furthermore, these disclosed embodiments do not need any singular, global view of the resources available in an underlying cloud architecture. In some embodiments, all agents that are located in a same hierarchical level execute independently (and potentially in parallel, depending upon timing) and make only local decisions. Each agent can merely act based on the information it has regarding its local resources. This is particularly beneficial given the high overhead that would be required for global monitoring and the time-varying nature of available resources in the cloud. Embodiments can also utilize equivalence classes to compactly describe the resource requirements, and take into account the location and affinity requirements of a request at multiple levels. Embodiments can be configured to never give false negative or false positive answers, and can be configured to determine very quickly those cases where no solution exists.

Various embodiments disclosed herein involve the use of electronic devices. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 9:
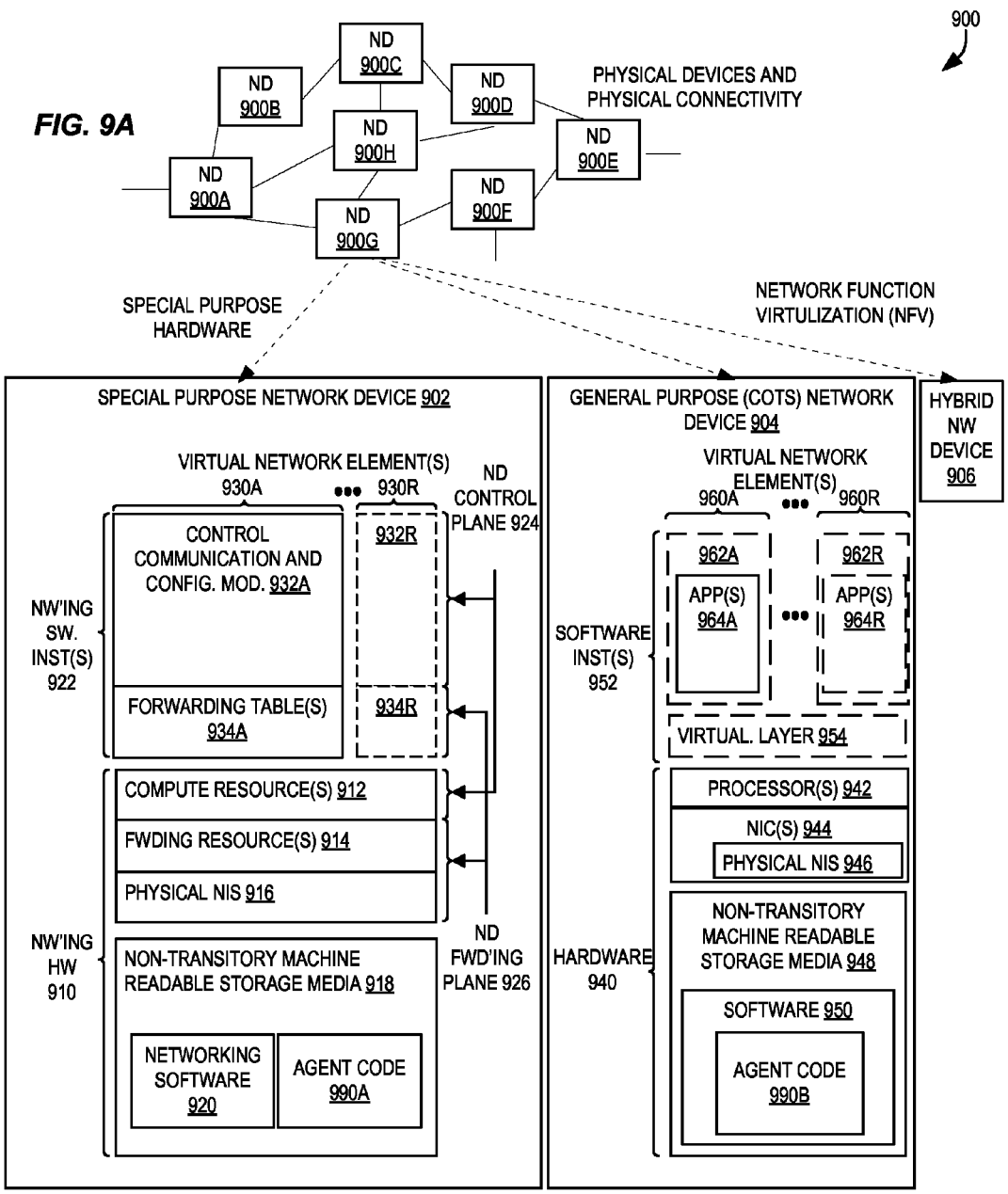
FIG. 9A illustrates connectivity between network devices (NDs) within an exemplary network, as well as three exemplary implementations of the NDs, according to some embodiments.
FIG. 9B illustrates an exemplary way to implement a special-purpose network device according to some embodiments.

FIG. 9A illustrates connectivity between network devices (NDs) within an exemplary network, as well as three exemplary implementations of the NDs, according to some embodiments of the invention. FIG. 9A shows NDs 900A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 900A, E, and F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application—specific integrated—circuits (ASICs) and a proprietary operating system (OS); and 2) a general purpose network device 904 that uses common off-the-shelf (COTS) processors and a standard OS.

The special-purpose network device 902 includes networking hardware 910 comprising compute resource(s) 912 (which typically include a set of one or more processors), forwarding resource(s) 914 (which typically include one or more ASICs and/or network processors), and physical network interfaces (NIs) 916 (sometimes called physical ports), as well as non-transitory machine readable storage media 918 having stored therein networking software 920. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 900A-H. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

Agent code 990A can include code which when executed by networking hardware 910, causes networking hardware 910 to implement any of the agents disclosed herein and to perform operations of one or more embodiments of the present invention as part of networking software instances 922.

The special-purpose network device 902 is often physically and/or logically considered to include: 1) a ND control plane 924 (sometimes referred to as a control plane) comprising the compute resource(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the compute resource(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

FIG. 9B illustrates an exemplary way to implement the special-purpose network device 902 according to some embodiments of the invention. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein software 950. During operation, the processor(s) 942 execute the software 950 to instantiate one or more sets of one or more applications 964A-R. This can include executing agent code 990A to implement any of the agents (as one or more of the one or more applications 964A-R) described herein with regard to the various disclosed embodiments using one or more processor(s) 942.

While one embodiment does not implement virtualization, alternative embodiments may use different forms of virtualization—represented by a virtualization layer 954 and software containers 962A-R. For example, one such alternative embodiment implements operating system-level virtualization, in which case the virtualization layer 954 represents the kernel of an operating system (or a shim executing on a base operating system) that allows for the creation of multiple software containers 962A-R that may each be used to execute one of the sets of applications 964A-R. In this embodiment, the multiple software containers 962A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 954 represents a hypervisor (sometimes referred to as a virtual machine monitor (VMM)) or a hypervisor executing on top of a host operating system; and 2) the software containers 962A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 964A-R, as well as the virtualization layer 954 and software containers 962A-R if implemented, are collectively referred to as software instance(s) 952. Each set of applications 964A-R, corresponding software container 962A-R if implemented, and that part of the hardware 940 that executes them (be it hardware dedicated to that execution and/or time slices of hardware temporally shared by software containers 962A-R), forms a separate virtual network element(s) 960A-R.

The virtual network element(s) 960A-R perform similar functionality to the virtual network element(s) 930A-R—e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments may implement one or more of the software container(s) 962A-R differently. For example, while some embodiments are illustrated with each software container 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 962A-R to VNEs also apply to embodiments where such a finer level of granularity is used.

In certain embodiments, the virtualization layer 954 includes a virtual switch that provides similar forwarding services as a physical Ethernet switch. Specifically, this virtual switch forwards traffic between software containers 962A-R and the NIC(s) 944, as well as optionally between the software containers 962A-R; in addition, this virtual switch may enforce network isolation between the VNEs 960A-R that by policy are not permitted to communicate with each other (e.g., by honoring virtual local area networks (VLANs)).

Software 950 can include agent code 990B which when executed by processor(s) 942, causes processor(s) 942 to perform operations of one or more embodiments of the present invention as part of software containers 962A-R.

The third exemplary ND implementation in FIG. 9A is a hybrid network device 906, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

The NDs of FIG. 9A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email or social services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the software containers 962A-R may operate as servers; the same would be true for the hybrid network device 906; in the case of the special-purpose network device 902, one or more such servers could also be run on a virtualization layer executed by the compute resource(s) 912); in which case the servers are said to be co-located with the VNEs of that ND.

Figure 10:
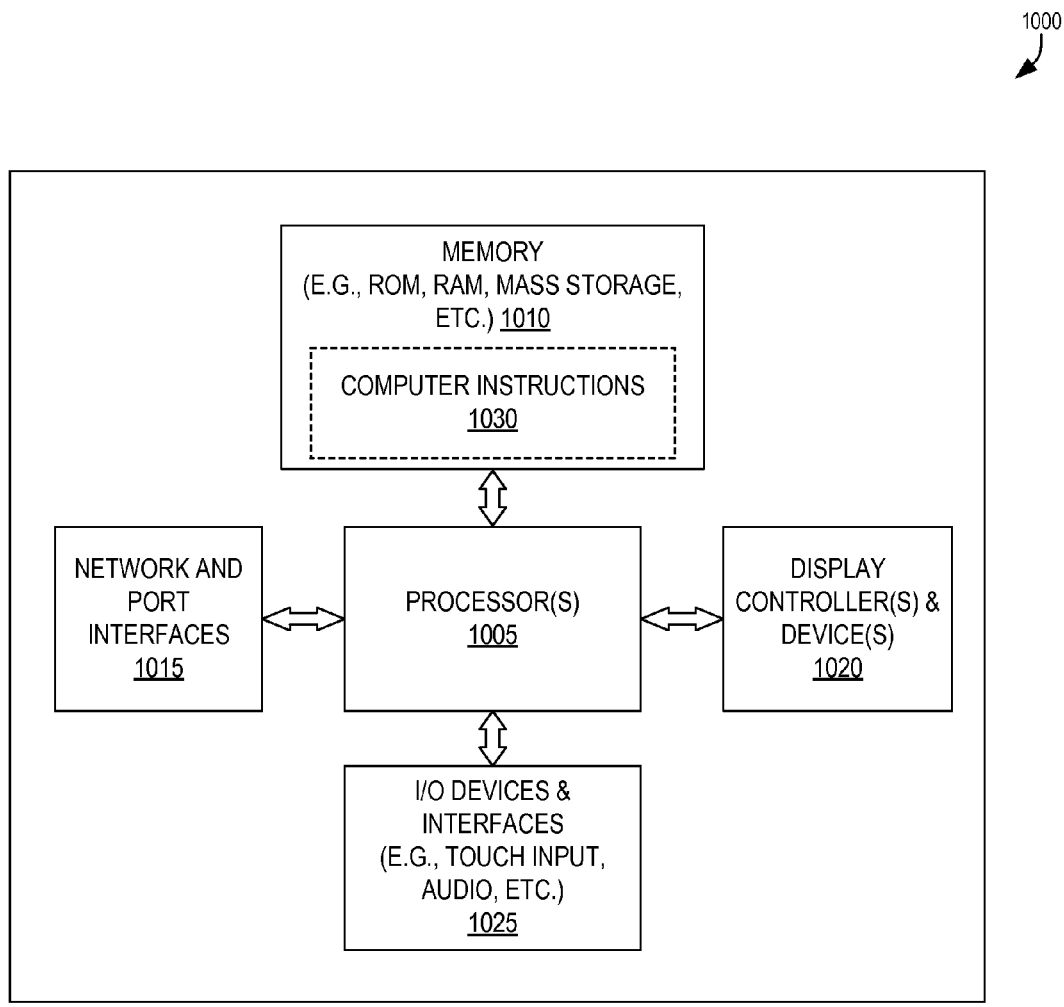
FIG. 10 is a block diagram illustrating an exemplary data processing system that may be used in some embodiments.

FIG. 10 illustrates a block diagram for an exemplary data processing system 1000 that may be used in some embodiments. Data processing system 1000 includes one or more microprocessors 1005 and connected system components (e.g., multiple connected chips). Alternatively, the data processing system 1000 is a system on a chip. One or more such data processing systems 1000 may be utilized to implement the functionality of the modules, server end stations, hosts, or other devices as illustrated above in FIGS. 1-9.

The data processing system 1000 includes memory 1010, which is coupled to the microprocessor(s) 1005. The memory 1010 may be used for storing data, metadata, and programs for execution by the microprocessor(s) 1005. For example, the depicted memory 1010 may store computer instructions 1030 that, when executed by the microprocessor(s) 1005, causes the data processing system 1000 to perform the operations described herein. The memory 1010 may include one or more of volatile and non-volatile memories, such as Random Access Memory ("RAM"), Read Only Memory ("ROM"), a solid state disk ("SSD"), Flash, Phase Change Memory ("PCM"), magnetic storage, or other types of data storage. The memory 1010 may be internal or distributed memory. In some embodiments, a portion or all of the computer instructions 1030 are stored on an external cloud device.

The data processing system 1000 may also include a display controller and display device 1020 that provides a visual user interface for the user, e.g., GUI elements or windows. The display device 1020 may also display various media content to the user. The data processing system 1000 also includes one or more input or output ("I/O") devices and interfaces 1025, which are provided to allow a user to provide input to, receive output from, and otherwise transfer data to and from the system. These I/O devices 1025 may include a mouse, keypad, keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 1000. The I/O devices and interfaces 1025 may also include a connector for a dock or a connector for a USB interface, FireWire, Thunderbolt, Ethernet, etc., to connect the system 1000 with another device, external component, or a network. Exemplary I/O devices and interfaces 1025 also include wireless transceivers, such as an Institute of Electrical and Electronics Engineers (IEEE) 802.11 transceiver, an infrared transceiver, a Bluetooth transceiver, a wireless cellular telephony transceiver (e.g., 2G, 3G, 4G, 5G), or another wireless protocol to connect the data processing system 1000 with another device, external component, or a network and receive stored instructions, data, tokens, etc. In some embodiments, these various components will be provided as a system on a chip (SoC). It will be appreciated that one or more buses may be used to interconnect the various components shown in FIG. 10.

For example, the data processing system 1000 may be a personal computer (PC), tablet-style device, a personal digital assistant (PDA), a cellular telephone (e.g., smartphone), a Wi-Fi based telephone, a handheld computer which may optionally include a cellular telephone, a media player, an entertainment system, a handheld gaming system, a wearable computing device (e.g., smartwatch, digital eyewear), or devices which combine aspects or functions of these devices, such as a media player combined with a PDA and a cellular telephone in one device. In other embodiments, the data processing system 1000 may be a network computer, server, network device, router, or an embedded processing device within another device or consumer electronic product. As used herein, the terms computer, system, device, processing device, and "apparatus comprising a processing device" may be used interchangeably with the term data processing system 1000 and include the above-listed exemplary embodiments.

It will be appreciated that additional components, not shown, may also be part of the system 1000, and, in some embodiments, fewer components than that shown in FIG. 10 may also be used in a data processing system 1000. For example, in some embodiments where the data processing system 1000 is a router, the router may have one or more control cards configure routing in the network and one or more line cards to switch packets in a network based on the routing configuration from the control cards.

It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 1010 or other non-transitory machine-readable storage medium. The software may further be transmitted or received over a network (not shown) via a network and/or port interface 1015. In various embodiments, hardwired circuitry may be used in combination with the software instructions to implement the present embodiments. Thus, the techniques are not limited to any specific combination of hardware circuitry and software, or to any particular source for the instructions executed by the data processing system 1000.

ALTERNATIVE EMBODIMENTS

The operations in the flow diagrams have been described with reference to the exemplary embodiments of the other diagrams. However, it should be understood that the operations of the flow diagrams can be performed by embodiments other than those discussed with reference to these other diagrams, and the embodiments discussed with reference these other diagrams can perform operations different than those discussed with reference to the flow diagrams.

Similarly, while the flow diagrams in the figures show a particular order of operations performed by some embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, various embodiments are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method in a leaf agent executing at a computing device and acting as a child to a parent agent in a hierarchy of agents for enabling decentralized service placement, the method comprising:
   receiving, at the leaf agent from the parent agent, a service request description that specifies resource requirements for a plurality of components of a service to be deployed;
   generating, based upon the resource requirements, a query placement partition identifying a plurality of groups of the plurality of components, wherein the plurality of groups includes a colocation group and a non-colocation group, wherein a first of the plurality of groups identified by the query placement partition includes the non-colocation group that comprises one or more non-colocation identifiers identifying one or more of the plurality of components that cannot be placed along with one or more components of the first group;
   generating, based upon the query placement partition and a set of resources available at one or more computing devices associated with the leaf agent, one or more solution encodings indicating possible placements of some or all of the components of the service request description that the one or more computing devices can locally provide while satisfying the resource requirements of the some or all of the components; and
   transmitting, by the leaf agent to the parent agent, the one or more solution encodings.

2. The method of claim 1, wherein generating the one or more solution encodings comprises:
   generating, based upon the plurality of groups identified by the query placement partition, one or more affinity-based encodings, wherein each of the one or more affinity-based encodings indicates a maximal number of components from each of the plurality of groups that could potentially be provided by the one or more computing devices.

3. The method of claim 2, wherein generating the one or more solution encodings further comprises:
   generating, based upon the one or more affinity-based encodings and a description of available local resources of the one or more computing devices, one or more refined encodings, wherein each of the one or more refined encodings is derived from one of the one or more affinity-based encodings and indicates numbers of the components of the corresponding affinity-based encoding that the one or more computing devices can actually provide given the available local resources.

4. The method of claim 1, wherein the resource requirements include, for each of the plurality of components, one or more of:
   a processing resource requirement;
   a memory resource requirement;
   a storage resource requirement; and
   a network interface requirement.

5. The method of claim 1, further comprising transmitting, by the leaf agent to the parent agent, the generated query placement partition.

6. The method of claim 1, wherein the parent agent is an intermediate agent in the hierarchy, acts as a parent to another leaf agent in the hierarchy, and acts as a child to another agent in the hierarchy.

7. The method of claim 1, wherein the parent agent is executed by a network device, wherein the network device is a switch, router, or bridge.

8. The method of claim 1, wherein:
the received service request description further specifies at least one affinity or location constraint associated with at least some of the plurality of components;
the generating of the query placement partition is further based upon the at least one affinity or location constraint; and
the one or more solution encodings are generated to satisfy the at least one affinity or location constraint.

9. A method in an intermediate agent executing at an electronic device and acting as a parent to a plurality of agents in a hierarchy and further acting as a child to another agent in the hierarchy, the method for enabling decentralized service placement, the method comprising:
receiving, at the intermediate agent from the another agent, a service request description that specifies resource requirements for a plurality of components of a service to be deployed, wherein the service request description includes, for a first of the plurality of components, one or more non-colocation identifiers that identify one or more others of the plurality of components that cannot be placed with the first component;
transmitting, by the intermediate agent, the service request description to the plurality of agents acting as children of the intermediate agent in the hierarchy;
receiving, by the intermediate agent from the plurality of agents, a plurality of solution encodings generated by the plurality of agents, wherein each of the plurality of solution encodings indicates an aggregated set of possible placements of some or all of the components of the service request description that one or more computing devices associated with the corresponding agent or associated with all descendant agents of the corresponding agent can provide while satisfying the resource requirements of the some or all of the components;
merging, by the intermediate agent, the plurality of solution encodings into one or more solution encodings that indicate another aggregated set of possible placements of some or all of the components of the service request description that one or more computing devices associated with the intermediate agent or associated with all descendant agents of the intermediate agent can provide while satisfying the resource requirements of the some or all of the components; and
transmitting, by the intermediate agent, the one or more merged solution encodings to the another agent acting as a parent to the intermediate agent.

10. The method of claim 9, wherein the plurality of agents acting as children of the intermediate agent act as intermediate agents in the hierarchy.

11. The method of claim 9, wherein the plurality of agents acting as children of the intermediate agent act as leaf agents in the hierarchy.

12. The method of claim 9, further comprising:
generating, by the intermediate agent, one or more local solution encodings indicating possible placements of some or all of the components of the service request description that the electronic device executing the intermediate agent can locally provide while satisfying the resource requirements of the some or all of the components,
wherein the merging of the plurality of solution encodings into the one or more solution encodings also includes merging the generated one or more local solution encodings with the plurality of solution encodings received from the plurality of agents.

13. The method of claim 9, wherein the another agent acts as a root agent in the hierarchy.

14. The method of claim 9, wherein the received service request description further specifies at least one affinity or location constraint associated with at least some of the plurality of components.

15. A system providing decentralized service placement, comprising:
a plurality of agents executing at one or more electronic devices and that are configured in a hierarchy, including:
a root agent acting as a root of the hierarchy, wherein the root agent is configured to:
receive service requests from clients indicating resource requirements for services to be deployed including pluralities of components,
transmit service request descriptions based upon the service requests to a plurality of intermediate agents of the hierarchy to be distributed to a plurality of leaf agents of the hierarchy,
receive solution encodings corresponding to the service request descriptions from the plurality of intermediate agents, wherein the solution encodings are generated by the plurality of intermediate agents and indicate sets of possible placements of some or all of the components of each of the service request descriptions that can be provided by a plurality of computing devices associated with the plurality of leaf agents that satisfy resource requirements of the some or all of the components, and
determine, based upon the received solution encodings, whether the service requests can be placed using the plurality of computing devices;
the plurality of intermediate agents, wherein each of the intermediate agents is configured to:
receive the transmitted service request descriptions transmitted from the root agent or another of the plurality of intermediate agents,
transmit the received service request descriptions to one or more other intermediate agents or one or more of the plurality of leaf agents,
receive solution encodings corresponding to the service request descriptions from the one or more other intermediate agents or the one or more of the plurality of leaf agents,
merge the received solution encodings, and
transmit the merged solution encodings to the root agent or to the another of the plurality of intermediate agents; and
the plurality of leaf agents, wherein each of the plurality of leaf agents is configured to:
receive, from one of the plurality of intermediate agents, the service request descriptions, generate query placement partitions for the service request descriptions, wherein each query placement partition identifies a plurality of groups of a plurality of components specified in the service request description, wherein a first of the plurality of groups includes a colocation group and a second of the plurality of groups includes a non-colocation group that comprises one or more non-colocation identifiers of a corresponding one or more components that cannot be placed with the one or more components of the second group, generate solution encodings based upon the generated query placement partitions and a set of resources available at one or more computing devices associated with the leaf agent, wherein each of the solution encodings indicates possible placements of some or all of the components of the corresponding service request description that the one or more computing devices can locally provide while satisfying the resource requirements of the some or all of the components, and transmit, to the one of the plurality of intermediate agents, the solution encodings.

16. The system of claim 15, wherein the hierarchy includes a plurality of levels of the plurality of intermediate agents.

17. The system of claim 15, wherein a first set of the plurality of leaf agents is associated with a first set of the one or more computing devices at a first data center that is geographically separate from a second data center having a second set of the one or more computing devices associated with a second set of the plurality of leaf agents.

18. The system of claim 15, wherein the root agent is further configured to:

determine, based upon the received solution encodings, deployment configurations for the service requests that are determined as able to be placed; and cause ones of the one or more computing devices to implement the some or all of the components of the service requests that are determined as able to be placed.

19. The system of claim 15, wherein the root agent is further configured to:

determine, based upon the received service requests, which of the plurality of intermediate agents to which the root agent will transmit the service request descriptions.

20. The system of claim 15, wherein the root agent is configured to transmit the service request descriptions to all of the plurality of intermediate agents of the hierarchy that act as children of the root agent in the hierarchy.

21. The system of claim 15, wherein at least some of the plurality of intermediate agents are executed by a plurality of network devices, wherein each network device comprises a switch device or a router device, and wherein at least some of the plurality of leaf agents are executed by server computing devices.

22. The system of claim 15, wherein:

one or more of the service requests received by the root agent specify at least one affinity or location constraint associated with at least some of the plurality of components of the corresponding service request; and each of the plurality of leaf agents generate the solution encodings, for those of the service requests that specify at least one affinity or location constraint, such that the corresponding solution encoding satisfies the at least one affinity or location constraint.

* * * * *